United States Patent
Sim et al.

(10) Patent No.: US 10,382,835 B2
(45) Date of Patent: Aug. 13, 2019

(54) APPARATUS AND METHOD FOR VERIFYING THE INTEGRITY OF VIDEO FILE

(71) Applicant: Penta Security Systems Inc., Seoul (KR)

(72) Inventors: Sang Gyoo Sim, Seoul (KR); Eui Seok Kim, Seoul (KR); Duk Soo Kim, Seoul (KR); Seok Woo Lee, Seoul (KR); Wan Yeon Lee, Seoul (KR)

(73) Assignee: Penta Security Systems Inc., Seoul (KR)

( * ) Notice: Subject to any disclaimer, the term of this patent is extended or adjusted under 35 U.S.C. 154(b) by 0 days.

(21) Appl. No.: 15/976,754

(22) Filed: May 10, 2018

(65) Prior Publication Data

US 2018/0332364 A1 Nov. 15, 2018

(30) Foreign Application Priority Data

May 11, 2017 (KR) .................. 10-2017-0058915

(51) Int. Cl.
*H04N 21/84* (2011.01)
*H04N 17/06* (2006.01)
*H04N 5/76* (2006.01)
*H04N 5/91* (2006.01)

(52) U.S. Cl.
CPC ............ *H04N 21/84* (2013.01); *H04N 5/76* (2013.01); *H04N 5/91* (2013.01); *H04N 17/06* (2013.01)

(58) Field of Classification Search
CPC  H04N 21/84; H04N 5/76; H04N 5/91; H04N 17/06
See application file for complete search history.

(56) References Cited

U.S. PATENT DOCUMENTS 8,769,292 B2 * 7/2014 Kim .................... G06F 21/6209
713/176
9,031,329 B1 * 5/2015 Farid .................. G06K 9/00577
382/209

FOREIGN PATENT DOCUMENTS

| JP | 2005-143094 A | 6/2005 |
| KR | 10-2007-0080354 A | 8/2007 |
| KR | 10-2012-0070700 A | 7/2012 |
| KR | 10-1384550 B1 | 4/2014 |
| KR | 10-2014-0119892 A | 10/2014 |

(Continued)

OTHER PUBLICATIONS

Communication from Korean Patent Office, Decision to grant a patent for Korean Application No. KR10-2017-0058915, dated Aug. 13, 2018, which corresponds to this application.

(Continued)

*Primary Examiner* — Huy T Nguyen
(74) *Attorney, Agent, or Firm* — Goldilocks Zone IP Law

(57) ABSTRACT

Provided are an apparatus and method for verifying the integrity of a video file. The method includes receiving a video file and model information of a video recording device which is claimed to have recorded a verification-target video, extracting a header structure and a header value of the video file, extracting characteristic information according to the received model information of the video recording device from a characteristic database, and determining whether the extracted characteristic information according to the model information of the video recording device corresponds to the header structure and the header value of the video file.

15 Claims, 14 Drawing Sheets

(56) References Cited

FOREIGN PATENT DOCUMENTS

| KR | 10-1512021 B1 | 4/2015 |
| KR | 10-2016-0037543 A | 4/2016 |
| KR | 10-2016-0060867 A | 5/2016 |
| KR | 10-1687989 B1 | 12/2016 |

OTHER PUBLICATIONS

Cha et al. Design and Implementation of Car Blackbox Forensic Analysis Tool Through the Analysis of Data Structure, KIPS Tr. Comp. and Comm. Sys., Nov. 2016, pp. 427-438, vol. 5 , No. 11, Korea Information Processing Society.

* cited by examiner

```
RIFF ('AVI '
    LIST ('hdrl'
        'avih'(<Main AVI Header>)
        LIST ('strl'
            'strh'(<Stream header>)
            'strf'(<Stream format>)
            { 'strd'(<Additional header data>) }
            { 'strn'(<Stream name>) }
            ...
        )
        ...
    )
    LIST ('movi'
        {SubChunk | LIST ('rec '
                        SubChunk1
                        SubChunk2
                        ...
                  )
            ...
        }
        ...
    )
    ['idx1' (<AVI Index>) ]
)
```

FIG. 5

| SEQ | OFFSET | TYPE | ID | SIZE | | NAME | VALUE |
|---|---|---|---|---|---|---|---|
| 0 | 0 | RIFF | AVI | 15672760 | | | |
| 1 | 12 | LIST | hdrl | 302 | | | |
| 2 | 24 | chunk | avih | 56 | | MicroSecPerFrame | 16733 |
| 3 | 88 | LIST | strl | 116 | | MaxBytesPerSec | 0 |
| 4 | 100 | chunk | strh | 56 | | PaddingGranularity | 0 |
| 5 | 164 | chunk | strf | 40 | | Flags | 272 |
| 6 | 212 | LIST | strl | 116 | | TotalFrames | 302 |
| 7 | 224 | chunk | strh | 56 | | InitialFrames | 0 |
| 8 | 288 | chunk | strf | 40 | | Streams | 4 |
| 9 | 336 | LIST | strl | 94 | | SuggestedBufferSize | 2183260 |
| 10 | 348 | chunk | strh | 56 | | Width | 1920 |
| 11 | 412 | chunk | strf | 18 | | Height | 1080 |
| 12 | 438 | LIST | strl | 70 | | Reserved (HEX) | 04 00 00 00 DA 05 00 00 00 00 00 00 00 00 00 00 |
| 13 | 450 | chunk | strh | 56 | | | |
| 14 | 514 | chunk | strf | 0 | | | |
| 15 | 522 | LIST | movi | 15672840 | | | |
| 16 | 15673370 | Index | idx1 | 1892 | | | |

Detailed Data ○ HEX ● READABLE

| UUID | Format | Reference |
|---|---|---|
| 0537cdcb-9dbc-4431-a72a-ca561c2a113e | Exif | ExifTool |
| 2c4c0100-8504-40b9-a0a3-e03e-1621896d4eb | Photoshop Image Resources | ExifTool |
| 33c7349d2-8816-4723-a0ba-f1a3e097fe38 | IPTC | |
| 8974dbcd-7be7-4c51-84c9-7198988853 | PIFF Track Encryption Box | PIFF specification |
| 8e82f1c1-4c08-4028-a7ae-d66e34451809 | GeoJP2 World File Box | GeoJP2 specification |
| a2394f30-5a9b-4f14-a244-6c427c649044 | PIFF Sample Encryption Box | PIFF specification |
| b14bf8bd-083e-4b43-a5ae-5cd7d5a6ce00 | GeoJP2 GeoTIFF Box | GeoJP2 specification |
| be7acfcb-97a9-42e8-9c71-999491e3a2ac | XMP | XMP specification |
| d08ae8f18-10f3-4a82-b4c8-32d8abe18338 | PIFF Protection System Specific Header Box | PIFF specification |

FIG. 11

| LIST ENTRY TYPE | DESCRIPTION | ALIGNMENT |
|---|---|---|
| ©arg | NAME OF ARRANGER | |
| ©ark | KEYWORD OF ARRANGER | X |
| ©cok | NAME OF COMPOSER | X |
| ©com | NAME OF COMPOSER | |
| ©cpy | DECLARATION OF COPYRIGHT | |
| ©day | DATE WHEN MOVIE CONTENT DATA WAS GENERATED | |
| ©dir | NAME OF MOVIE DIRECTOR | |
| ©ed1 to ©ed9 | DATE AND DESCRIPTION OF EDITING | |
| ©fmt | DISPLAY OF MOVIE FORMAT (GENERATION BY COMPUTER, DIGITIZATION, ETC.) | |
| ©inf | INFORMATION ON MOVIE | |
| ©isr | ISRC CODE | |
| Sel0 | PLAY SELECTED ONLY – BYTE REPRESENTING THAT ONLY SELECTED REGION OF MOVIE IS TO BE PLAYED | |
| WLOC | DEFAULT WINDOW POSITION OF MOVIE – TWO 16-BIT VALUES (X,Y) | |

| SampleCount | compositionOffset | Field |
|---|---|---|
| 4 | 4 | Bytes |

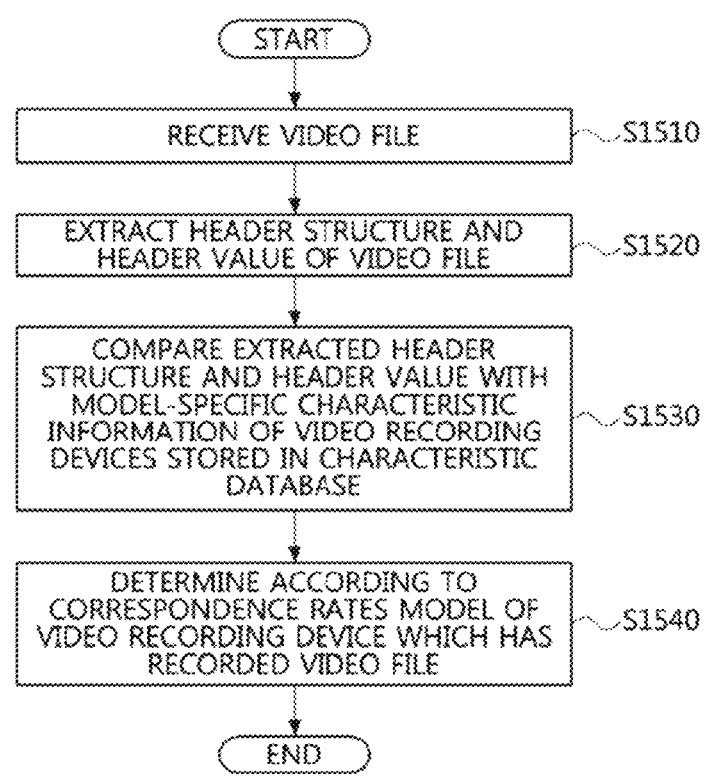

APPARATUS AND METHOD FOR VERIFYING THE INTEGRITY OF VIDEO FILE

CLAIM FOR PRIORITY

This application claims priority to Korean Patent Application No. 2017-0058915 filed on May 11, 2017 in the Korean Intellectual Property Office (KIPO), the entire contents of which are hereby incorporated by reference.

BACKGROUND

1. Technical Field

Example embodiments of the present invention relate to an apparatus and method for verifying the integrity of a video file, and more specifically, to an apparatus and method for verifying the integrity of a video file based on a header structure and a header value of the video file generated when a video recording device is used for recording.

2. Related Art

Video recording devices, such as a vehicle blackbox and a closed circuit television (CCTV) system, are lately becoming widespread to verify cases and accidents. Here, most videos obtained with video recording devices are stored as audio video interleaved (avi) file and motion picture experts group (MPEG)-4 part 14 (mp4) file formats. Also, most of the videos may be modified through editing programs and replaced by videos recorded with other video recording devices. Therefore, integrity (the original without any modification or change) verification is important for using recorded video as evidence of a case or an accident.

There is a technique for detecting still image modification as an existing technology for verifying the integrity of a video. According to this technique, partial noises of a single still image are compared, and a part of the image in which noise is significantly changed is determined as a modified part. However, the technique for detecting a still image modification involves extracting still image frames from a video file and applying the technique to each of the still image frames, thus requiring a large amount of time.

As one advanced technology of the above-described technique for detecting still image modification, there is a technique for detecting an image modification based on the header of a file. According to this technique, a structural characteristic of the headers of files, which are used in video editing programs, is examined in advance, and it is determined whether a video file, which is the target of verification, is a file generated by an editing program. However, since it is determined whether the video file, which is the target of verification, is in the same format as a file generated by the editing program, it is impossible to determine whether the video file is in the same format as a file generated by a specific video recording device.

SUMMARY

Accordingly, example embodiments of the present invention are provided to substantially obviate one or more problems due to limitations and disadvantages of the related art.

Example embodiments of the present invention provide a method of verifying the integrity of a video file based on a header structure and a header value of the video file.

Example embodiments of the present invention also provide an apparatus for verifying the integrity of a video file by using the method of verifying the integrity of a video file.

In some example embodiments, an apparatus for verifying the integrity of a video file includes: an extractor configured to extract a header structure and a header value of a verification-target video file; a characteristic database configured to store model-specific characteristic information of one or more video recording devices; and an analyzer configured to verify integrity of the verification-target video file by using the extracted header structure and header value and the model-specific characteristic information of the one or more video recording devices stored in the characteristic database.

Here, the model-specific characteristic information may include header structures and header values which are differently set in video files according to the models of the one or more video recording devices.

Also, the apparatus may further include an updater configured to update the model-specific characteristic information stored in the characteristic database.

Meanwhile, the apparatus may further include an input unit to which at least one piece of verification-target information is input.

Here, when only the video file is input to the input unit, the analyzer may determine, in the characteristic database, a video recording device model corresponding to the header structure and the header value of the video file.

Also, when the video file and model information of a video recording device which is claimed to have recorded the video are input to the input unit, the analyzer may extract characteristic information according to the model of the claimed video recording device from the characteristic database and determine whether the extracted characteristic information according to the model of the video recording device corresponds to the header structure and the header value of the video file.

Here, whether the extracted characteristic information corresponds to the header structure and the header value of the video file may be represented as a probability from a number of corresponding items among a number of compared items.

Meanwhile, when the video file is in an audio video interleaved (avi) format, a header value corresponding to the compared items may include at least one of an INAM string value representing a title of the video file, an ISFT string value representing software (SW) used for the video file, and an fccHandler value among stream header (strh) structure values of a video list (vide LIST).

Also, when the video file is in a motion picture experts group (MPEG)-4 part 14 (mp4) format, a header value corresponding to the compared items may include at least one of an attribute value of a free region and an attribute value of a meta region.

In other example embodiments, a method of verifying the integrity of a video file includes: extracting a header structure and a header value of a verification-target video file; and verifying the integrity of the verification-target video file by using the extracted header structure and header value and model-specific characteristic information of video recording devices stored in a characteristic database.

Here, the model-specific characteristic information may include header structures and header values which are differently set in video files according to the models of the video recording devices.

Also, the method may further include updating the model-specific characteristic information stored in the characteristic database.

Meanwhile, the method may further include: receiving the video file; and determining, in the characteristic database, a video recording device model corresponding to the header structure and the header value of the video file.

Also, the method may further include: inputting the video file and model information of a video recording device which is claimed to have recorded the video; extracting characteristic information according to the received model information of the video recording device from the characteristic database; and determining whether the extracted characteristic information according to the model information of the video recording device corresponds to the header structure and the header value of the video file.

Here, whether the extracted characteristic information corresponds to the header structure and the header value of the video file may be represented as a probability from a number of corresponding items among a number of compared items.

Meanwhile, when the video file is in an avi format, a header value corresponding to the compared items may include at least one of an INAM string value representing a title of the video file, an ISFT string value representing SW used for the video file, and an fccHandler value among strh structure values of a video list (vide LIST).

Also, when the video file is in an mp4 format, a header value corresponding to the compared items may include at least one of an attribute value of a free region and an attribute value of a meta region.

BRIEF DESCRIPTION OF DRAWINGS

Example embodiments of the present invention will become more apparent by describing in detail example embodiments of the present invention with reference to the accompanying drawings, in which:

FIG. 5 is a table showing header structures and header values of a video file when a video is recorded in the avi format by using a specific video recording device according to an example embodiment of the present invention.

FIG. 6 is a table showing header structures and header values of a video file when a video is recorded in the avi format by using another specific video recording device according to another example embodiment of the present invention.

FIG. 9 is a table showing a list of universally unique identifiers (uuids) in an mp4-format file structure.

FIG. 11 is a table showing item types of a user data list in an mp4-format file structure.

FIG. 15 is a flowchart illustrating a method of verifying the integrity of a video file according to another example embodiment of the present invention when model information of a video recording device which has recorded a video is not acquired.

DESCRIPTION OF EXAMPLE EMBODIMENTS

Figure 1:
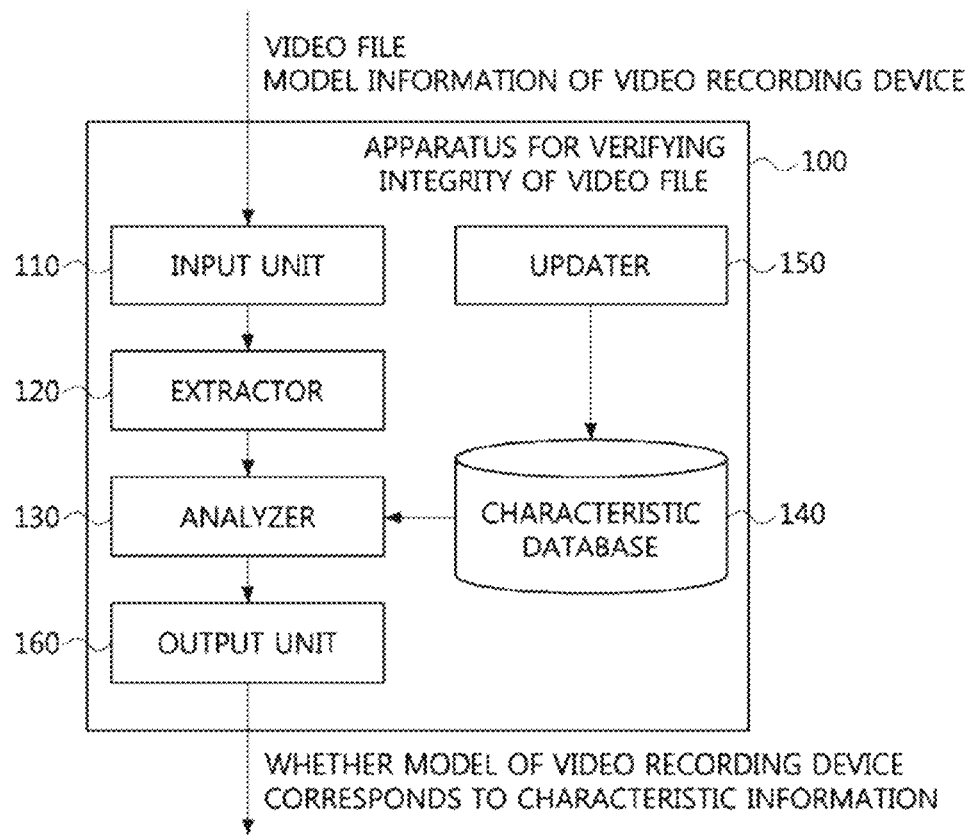
FIG. 1 is a block diagram of an apparatus for verifying the integrity of a video file according to an example embodiment of the present invention.

Example embodiments of the present invention are disclosed herein. However, specific structural and functional details disclosed herein are merely representative for purposes of describing example embodiments of the present invention, and example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, A, B, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to limit the invention. As used herein, the singular forms "a", "an", and "the" are intended to include the plural forms as well, unless the context clearly indicates otherwise. It will be further understood that the terms "comprises", "comprising,", "includes", and/or "including", when used herein, specify the presence of stated features, integers, steps, operations, elements, components, and/or groups thereof but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Hereinafter, exemplary embodiments of the present invention will be described in detail with reference to the accompanying drawings.

FIG. 1 is a block diagram of an apparatus for verifying the integrity of a video file according to an example embodiment of the present invention.

An apparatus 100 for verifying the integrity of a video file according to an example embodiment of the present invention may include an input unit 110, an extractor 120, an analyzer 130, a characteristic database 140, an updater 150, and an output unit 160.

The input unit 110 may receive a video file whose integrity will be verified. Also, the input unit 110 may receive model information of a video recording device which is claimed to have recorded the received video. The extractor 120 may extract a header structure and a header value of the video file input to the input unit 110.

When only the video file is input to the input unit 110, the analyzer 130 may determine, in the characteristic database 140, a video recording device model which corresponds to the header structure and the header value of the video file extracted by the extractor 120. Here, the header structure and the header value of the video file may be compared with model-specific characteristic information of video recording devices stored in the characteristic database 140, and a video recording device model whose characteristic information corresponds to the header structure and the header value may be determined as the corresponding video recording device model.

Also, when the video file and model information of a video recording device which is claimed to have recorded the video are input to the input unit 110, the analyzer 130 may compare characteristic information stored in the characteristic database 140 and corresponding to the input model information of the video recording device with the header structure and the header value of the video file, and determine whether the characteristic information corresponds to the header structure and the header value.

The characteristic database 140 may store the model-specific characteristic information of video recording devices, which may be examined and managed in advance. Here, the characteristic information is set when video recording devices are used to generate video files, and may include header structures and header values of the generated video files.

The updater 150 may update the information stored in the characteristic database 140. Here, the update may be automatically and periodically performed, but is not limited thereto. The update may be manually or aperiodically performed.

When only the video file is input to the input unit 110, the output unit 160 may output and provide the video recording device model determined by the analyzer 130 to a user. When the video file and the model information of a video recording device which is claimed to have recorded the video are input to the input unit 110, the output unit 160 may output and inform a user about whether the characteristic information corresponding to the model information corresponds to the header structure and the header value, which is determined by the analyzer 130

Since the header structure and the header value of the video file vary according to software (SW) installed in a video recording device, the video recording device model or whether the characteristic information corresponds to the header structure and the header value output by the output unit 160 may become the basis of determining whether the verification-target file has been altered with a video recorded by another video recording device, whether the verification-target file has been modified by an editing program, and the like, and may be used to verify integrity of the video file.

In the apparatus 100 for verifying the integrity of a video file according to an example embodiment of the present invention, the video file may include files in the audio video interleaved (avi), motion picture experts group (MPEG)-4 part 14 (mp4), Windows media video (wmv), mov, flash video (fly), and Matroska (mkv; including an audio file in the mka format) formats, but is not limited thereto. Also, a video recording device may include a vehicle blackbox and a closed circuit television (CCTV) system, but is not limited thereto.

Characteristics of the video file formats will be described below.

Avi-format files correspond to a standard video format of Microsoft Corp. Avi-format files make it possible to designate a codec without restraint, have a function for video recording, and also have a function of designating a recording capacity and generating an empty file with the capacity in advance. However, avi-format files are mainly intended to be played by personal computers (PCs), and thus avi-format files may not be used in other electronic devices. Since any codec may be used, it is necessary to install the corresponding codec for editing.

Mp4-format files are mainly used by an H.264/MPEG-4 advanced video coding (AVC) codec, and are similar to a format of MPEG-2 transport stream (m2ts) files used by Sony Corp. Mp4-format files provide good picture quality relative to size, but requires high performance for playing.

Wmv-format files correspond to Windows standard media files of Microsoft Corp., and as an advanced version of the asf format, have the same structure as asf-format files. Also, wmv-format files are intended to be mainly played on the Internet and relatively highly compressed. Although codecs are not freely designated for wmv-format files, it is possible to set standards including MPEG-4 and WMV 7/8/9/9 advanced profile standards. However, it may take a long time to search for a key frame or perform exploring (move a play bar).

Mov-format files were developed by Apple Inc. Mov-format files may be played by Macintosh (Mac) computers or quick time players, and may also be played by cameras from Canon Inc. employing the ProRes codec from Apple Inc. Mov-format files have an atom-based structure which is similar to that of mp4-format files.

Flv-format files were developed by Adobe Systems Inc. Fly-format files involve bar-type encoding like swf-format files, and may be supported by Adobe flash players. Fly-format files are preferred for videos included in web sites such as YouTube.

Mkv-format files correspond to an open-standard free-container format and a universal format for storing multimedia content such as movies, television dramas, and the like. Also, it is possible for one mkv-format file to contain an unlimited number of video, audio, picture, and subtitle tracks. However, mkv-format files are frequently unsupported by products of Apple Inc. or Adobe Systems Inc.

Table 1 below shows video file formats according to some types of blackboxes used as video recording devices.

TABLE 1

| File format | Products |
|---|---|
| avi | Thinkware - iNavi FXD700, iNavi CLAIR, iNavi E100, iNavi FXD900, iNavi G100, iNavi Black CLAIR, and iNavi CLAIR POP<br>FineVu - CR-200HD, CR-500HD, PRO, and PRO Full<br>Midong & Cinema - Urive Shotgun<br>HYUNDAI MnSOFT - Softman 700, Softman r700, Softman R300DL, Softman R320DL, and HDR-1280<br>DIONJAMES - Black Angel 2 Channel HD, and Black Angel HD<br>QRONTECH - Lukas LK-5900, and Lukas LK-7500FHD<br>Mando - BN300, and BN500D<br>DongwonSystems - Ezmasters P9<br>IT-ON - Livue LB200<br>Lexview - LX200F<br>Ether Technology - Bulls-i Unicorn ETK-B2400<br>Joongang M&C - Blackcop 2 Channel 200<br>iriver - X300<br>ORACOM - cleanView CM1000<br>Caidrox - Pro CD-600L<br>INNOTEK Korea - Smart-I 3500<br>DAS 9View - TB-9 Season2<br>HANSAE7 - Perfect 300<br>VisionDrive - VD-7000w |
| mp4 | Thinkware - iNavi Black<br>DABONDA - DBR-200h+, HAD-100V, Gallery GBR-2000H, Gallery DBR-2000HN, New Gallery DBR-2000HN, and Brother 300<br>HYUNDAI AUTOCOM - Real View HD<br>PITTASOFT - BlackVue DR350, BlackVue DR400, BlackVue DR400G-HD, BlackVue DR550GW-2CH, BlackVue DR980G-HD, and BlackVue WIFI DR500GW-HD<br>Midong & Cinema - Urive HD, Urive Single, Urive Albatross, Urive Albatross md-7000P, Urive Albatross1, and Urive Eagle 2CH<br>HYUNDAI Media Ace - ATOM AL-350, ATOM FH7000, ATOM K3000, and ATOM Gold AL-390 (2CH)<br>HYUNDAI MOBICOM - IT-8000 2CH HD<br>iTRONICS - ITB-50, and ITB-70G<br>JAEWONCNC - IROAD 3300CH, and IROAD IONE 250V<br>YOOILSTAR - RealView HD 2CH<br>Honeywell - 100WN<br>IMERCURY - MD-100 |
| 3gp | HMS - Road Memory |

Figure 2:
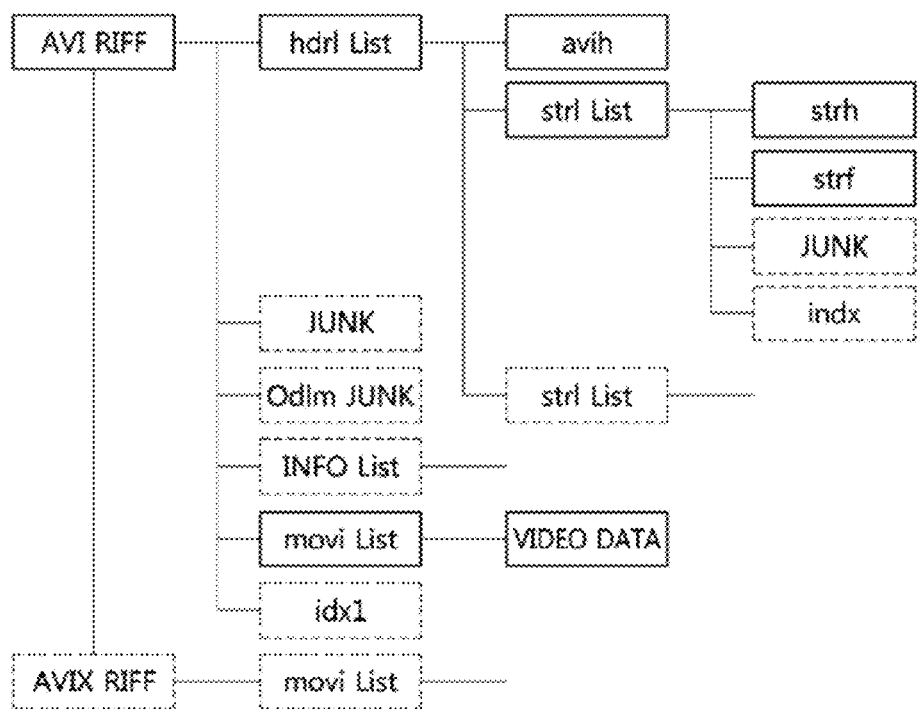
FIG. 2 is a diagram showing a header structure of a video file in the audio video interleaved (avi) format.

FIG. 2 is a diagram showing a header structure of an avi-format video file.

A method of verifying the integrity of a video file according to an example embodiment of the present invention when an input video file is in the avi format will be described below.

Avi is a video format for containing digital video and audio data used in Microsoft Windows, and various compression methods are used therefor. The avi format only serves as a container of video and audio, and picture quality and sound quality thereof are entirely determined by a codec used for compression. Such an avi format was developed in 1992, and there is the avi2 (open data manipulation language (OpenDML)) format obtained by improving a length limitation of 2 GB.

An avi-format video file uses a four-character code (FourCC) of 4 bytes, and may be composed of a resource interchange file format (RIFF) header and one or more lists and chunks following the RIFF header. Regions which are not designated as "list" regions will be regarded as chunks below.

As shown in FIG. 2, a header structure of an avi-format video file may be a tree structure.

In FIG. 2, AVI RIFF, hdrl list, avih, strl List, strh, strf, and movi List which are in solid-line boxes may be necessary regions, and JUNK, indx, strl List, Odlm JUNK, INFO List, idx1, AVIX RIFF, and movi List which are in dotted-line boxes may be optional regions. In the tree structure of an avi video file, only RIFF and List regions may have subordinate tree structures (children).

A header region of an avi-format video file will be described below.

AVI RIFF: a beginning portion of the file informing that the file is in the avi format hdrl List: a main header composed of an AVIMAIN-HEADER structure for defining global information of the whole file, such as the number of streams within the file and the width and height of an avi sequence avih: a configuration information header of the whole video strl List: a stream header of each of video, audio, and subtitle, which is required by each data stream, includes quality of service (QoS) information of each stream, and necessarily includes strh and strf strh: a configuration information header of each stream strf: format information of each stream JUNK: inserted for spatial arrangement, and the content of JUNK is ignored by applications indx: a super index of video data INFO List: a header of other information movi List: an actual video data header which includes avi sequence data and in which rec grouping is used in the case of a file interleaved to play from a compact disc read-only memory (CD-ROM)

idx1: indices of video data

AVIX RIFF: an extended header when the file has a large size

Figure 3:
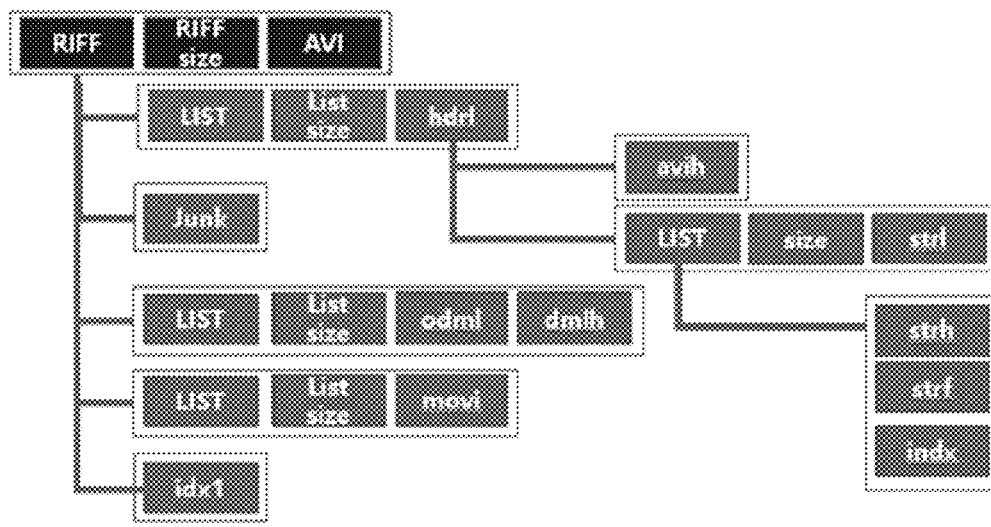
FIG. 3 is a diagram showing a schematic structure of a video file in the avi2 (open data manipulation language (OpenDML)) format.

FIG. 3 is a diagram showing a schematic structure of a video file in the avi2 (OpenDML) format.

Odml list which is an item added to avi2 (openDML) may include dmlh as an extended file header, and dmlh may use an ODMLExtendedAVIHeader structure.

Detailed information related to a configuration of a video file header in the avi and avi2(openDML) formats is given below. Table 2 shows detailed information about avih, and Table 3 shows detailed information about strh. Also, Table 4 shows detailed information about strf regarding a video stream, and Table 5 shows detailed information about strf regarding an audio stream.

TABLE 2

| Detailed information name | Description |
| --- | --- |
| dwMicroSecPerFrame | Duration of one video frame in units of microseconds |
| dwMaxBytesPerSec | A maximum data rate in the file |
| dwPaddingGranularity | The file filled with multiples |
| dwFlags | Whether there is an index chunk, and the type of the index chunk |
| dwTotalFrames | The number of video frames in RIFF-AVI |
| dwInitialFrames | Ignored |
| dwstreams | The number of streams |
| dwSuggestedBufferSize | A buffer size required to contain a chunk in the file |
| dwWidth | The width of a video stream |
| dwHeight | The height of a video stream |
| dwReserved[4] | An unused region |

TABLE 3

| Detailed information name | Description |
| --- | --- |
| fccType | Indicates any one of video, audio, and subtitle |
| fccHandler | FOURCC of a codec to be used |
| dwFlags | AVISF_DISABLED and AVISF_VIDEO_PALCHANGES |
| dwInitialFrames | The number of first blocks of a stream |
| dwRate/dwScale | Represents any one of frames/sec (video), samples/sec (audio), and duration (subtitle) according to type |
| dwStart | The start time of a stream |
| dwLength | The size of a stream in a unit (dwRate/dwScale) |
| dwSuggestedBufferSize | A buffer size required to store blocks of a stream |

TABLE 3-continued

| Detailed information name | Description |
| --- | --- |
| dwQuality | The quality of a stream |
| dwSampleSize | The number of bytes of one stream atom (unable to be further divided) |

TABLE 4

| Detailed information name | Description |
| --- | --- |
| biSize | The number of bytes required by a structure |
| biWidth | The width of a bitmap in units of pixels |
| biHeight | The height of a bitmap in units of pixels |
| biPlanes | 1 (the number of dimensions of a target device) |
| biBitCount | The number of bits per pixel |
| biCompression | The compression type of a compressed bottom-up bitmap |
| biSizeImage | The size of an image in units of bytes |
| biXPelsPerMeter | A horizontal resolution (pixels/meter) |
| biYPelsPerMeter | A vertical resolution (pixels/meter) |
| biClrUsed | The number of color indices in a color table |
| biClrImportant | The number of color indices required to display a bitmap |
| BITMAPINFOHEADER structure | |

TABLE 5

| Detailed information name | Description |
| --- | --- |
| wFormatTag | The type of an audio format |
| nChannels | The number of channels of audio data |
| nSamplesPerSec | The sample frequency of each channel used by a player |
| nAvgBytesPerSec | A required average data transmission rate in units of bytes/sec |
| nBlockAlign | Block alignment in units of bytes corresponding to the size of a minimum atom unit of data |
| wBitsPerSample | The number of bits/sample of a format |
| cbSize | The size of added format information in units of bytes |

Header information of an avi-format video file may be additionally present in INFO LIST which is after an strl chunk. Here, INFO LIST may be the registered global format type in which information helpful in identifying the content of a chunk may be stored. Also, INFO LIST may only include pre-designated chunks of Table 6. A new chunk may be defined, but an application may ignore a chunk that cannot understand the new chunk. Each chunk may include a ZSTR chunk which is used to store American standard code for information interchange zero (ASCIIZ) strings (null-terminated string). Table 6 below shows chunk identifiers (IDs) and descriptions of additional header information which may present in INFO LIST.

TABLE 6

| Chunk ID | Description |
|---|---|
| IARL | Archival location. Indicates where the subject of the file is archived. |
| IART | Artist. Lists the artist of the original of the file. For example, "Michaelangelo" |
| ICMS | Commission. Lists the name of a person or an organization authorized for the file. For example, "Pope Jullian II" |
| ICMT | Comment. Provides general comments about the file or the subject of the file. When the comment is several sentences long, end each sentence with a period. Does not include newline characters. |
| ICOP | Copyright. Records copyright information of the file. For example, "Copyright Encyclopedia International 1991." When there are multiple copyrights, separate them by a semicolon followed by a space. |
| ICRD | Creation date. Specifies the date when the subject of the file was created. Lists dates in year-month-day format, and places a zero to the left of one-digit months and days. For example, "1553-05-03." |
| ICRP | Cropped. Indicates whether an image has been cropped and how it was cropped. For example, "lower right corner." |
| IDIM | Dimensions. Specifies the size of the original subject of the file. For example, "8.5 in h, 11 in w." |
| IDPI | Dots per inch. Stores a dots-per-inch setting of a digitizer used to produce the file. For example, "300." |
| IENG | Engineer. Stores the name of an engineer who worked on the file. When there are multiple engineers, separate the names by a semicolon and a blank. For example, "Smith John; Adams Joe." |
| IGNR | Genre. Describes an original work. For example, "landscape," "portrait, and "still life." |
| IKEY | Keyword. Provides a list of keywords which refer to the file or the subject of the file. Separate multiple keywords with a semicolon and a blank. For example, "Seattle; aerial view; scenery." |
| ILGT | Brightness. Describes changes in brightness settings of a digitizer required to produce the file. The format of this information depends on hardware used. |
| IMED | Medium. Describes the original subject of the file, such as "computer image," "drawing," "lithograph," and so on. |
| INAM | Name. Stores the title of the subject of the file. For example, "Seattle From Above." |
| IPLT | Palette setting. Specifies the number of colors which are requested for digitizing an image. |
| IPRD | Product. Specifies the name of a title originally intended for a file. For example, "Encyclopedia of Pacific Northwest Geography." |
| ISBJ | Subject. Describes the content of the file. For example, "Aerial view of Seattle." |
| ISFT | Software. Identifies the name of an SW package used to create the file. For example, "Microsoft Wave Edit." |
| ISHP | Sharpness. Identifies changes in sharpness of a digitizer required to produce the file (a format depends on hardware used). |
| ISRC | Source. Identifies the name of a person or an organization which supplied the original subject of the file. For example, "Trey Research." |
| ISRF | Source form. Identifies the original form of digitized data. For example, "slide," "paper," "map," and so on. This is not necessarily the same as IMED |
| ITCH | Technician. Identifies the technician who digitized the subject of the file. For example, "Smith John." |

Figure 4:
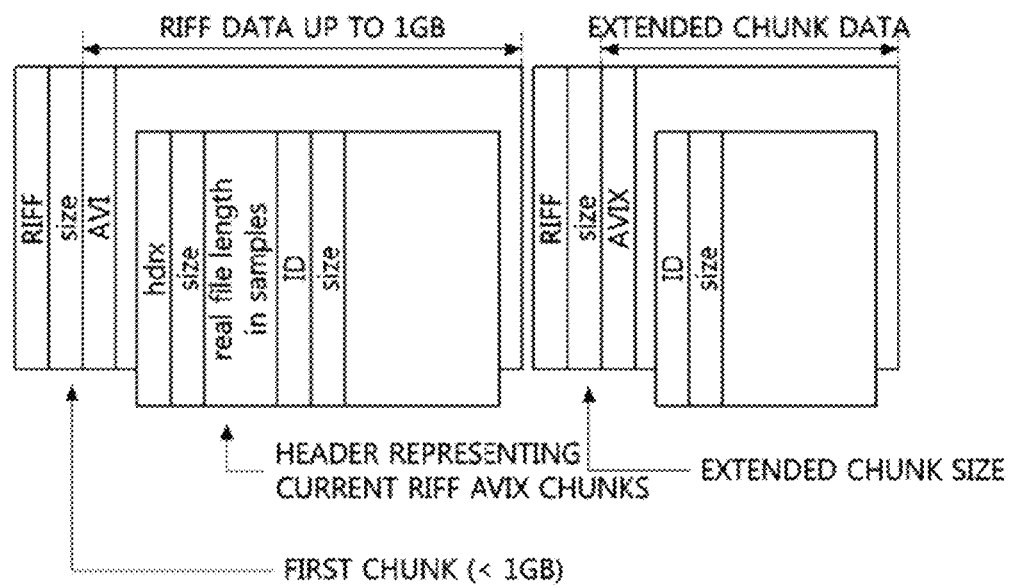
FIG. 4 is a diagram showing a structure which is extended when the size of an avi-format video file is greater than 1 GB.

FIG. 4 is a diagram showing a structure which is extended when the size of an avi-format video file is greater than 1 GB.

As shown in FIG. 4, in an avi-format file, each chunk has a maximum size of 1 GB. Therefore, when the size of an entire file is greater than 1 GB, the file has an extended structure. The extended structure further includes an additional chunk indicated as AVIX in an existing structure. AVIX may only include movi List, and all AVI header information may be included in a first RIFF AVI.

FIG. 5 is a table showing header structures and header values of a video file when a video is recorded in the avi format by using a specific video recording device according to an example embodiment of the present invention.

In a method of verifying the integrity of a video file according to an example embodiment of the present invention, a video recording device is assumed to be the iNavi FXD700 Black Box.

A video file recorded with the iNavi FXD700 Black Box is in the avi format and may have a header structure and header values as shown in FIG. 5. Here, ID List may show a header structure, and Detailed Data may show header values.

As shown in FIG. 5, a header structure of a video file recorded with the iNavi FXD700 Black Box may include hdrl, strl, and movi as list types, include avih, strh, and strf as chunk types, and include idx1 as an index type. Also, header values may include MicroSecPerFrame, MaxBytesPerSec, PaddingGranularity, Flags, TotalFrames, InitialFrames, Streams, SuggestedBufferSize, Width, Height, and Reserved (HEX).

Figure 6:
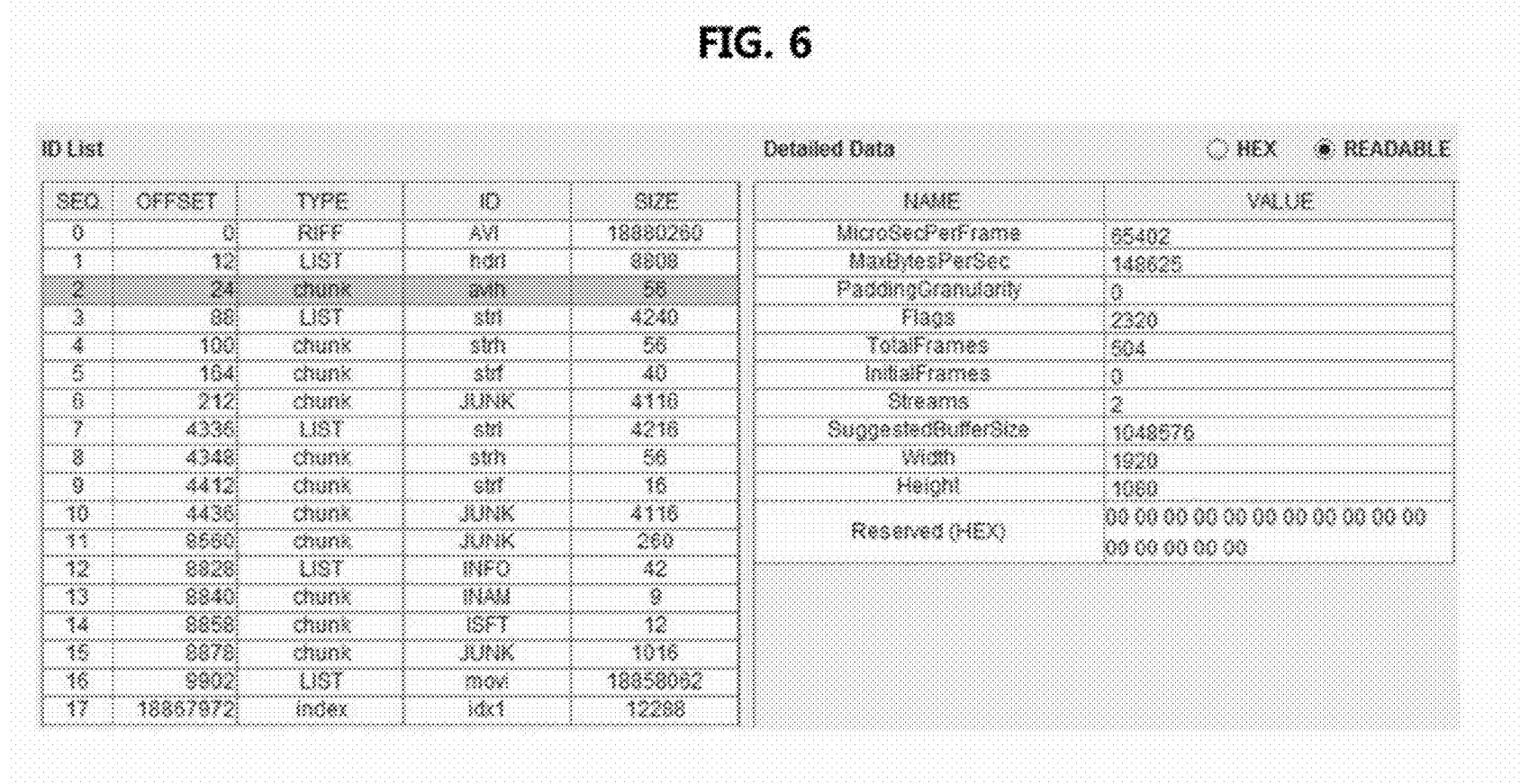

FIG. 6 is a table showing header structures and header values of a video file when a video is recorded in the avi format by using another specific video recording device according to another example embodiment of the present invention.

In a method of verifying the integrity of a video file according to another example embodiment of the present invention, a video recording device is assumed to be the FineVu CR-200HD Black Box.

A video file recorded with the FineVu CR-200HD Black Box is in the avi format and may have a header structure and header values as shown in FIG. 6. Here, ID List may show a header structure, and Detailed Data may show header values.

As shown in FIG. 6, a header structure of a video file recorded with the FineVu CR-200HD Black Box may include hdrl, strl, INFO, and movi as list types, include avih, strh, strf, JUNK, INAM, and ISFT as chunk types, and include idx1 as an index type. Also, header values may include MicroSecPerFrame, MaxBytesPerSec, PaddingGranularity, Flags, TotalFrames, InitialFrames, Streams, SuggestedBufferSize, Width, Height, and Reserved (HEX).

Video files generated by video recording devices of the same model may have the same header structure and header value. On the other hand, video recording devices of different models may have different header structures and header values even if they are manufactured by the same company.

In a method of verifying the integrity of a video file according to an example embodiment of the present invention, video recording devices may have different operation characteristics. Therefore, operation characteristics of some video recording devices which record avi-format videos will be listed below by way of example. However, video recording devices of the present invention are not limited to those listed below.

1. (Thinkware) iNavi FXD700 (maha): firmware virsion P2_1.00.18 and 1.00.44

1-1. Header file structural characteristic (applied to basic comparison)

Header LIST(hdrl, avih), "vide" LIST(strl, strh, strf), "vide" LIST(strl, strh, strf), "auds" LIST(strl, strh, strf), "txts" LIST(strl, strh, strf), movi LIST, and idx1

Arrangement in order of front view screen, rearview screen, audio recording, and subtitle function "Auds" LIST is omittable (in an environment in which the audio recording function is set to "off")

1-2. Header-file field value characteristic (applied to detailed correspondence probability determination: the number of corresponding items/the number of compared items=probability of correspondence)

Structure attribute values of an avih region: MaxBytesPerSec=0, PaddingGranularity=0, Flags=272, and Reserved=0x64000000B50B, 0x64000000DA05, or 0x64000000E703

Strh structure values of "vids" LIST: fccHandler=0x48323634 ("H264," applied to basic comparison), Scale=100, Quality=−1, and SampleSize=0

Strh structure values of "auds" LIST: fccHandler=1, Scale=1, Quality=−1, and SampleSize=1

Strh structure values of "txts" LIST: fccHandler=0, Scale=100, Rate=0, Quality=−1, and SampleSize=0

2. (Thinkware) iNavi FXD900 (maha): identical to FXD700

2-1. Header file structural characteristic (applied to basic comparison)

Header LIST(hdrl, avih), "vide" LIST(strl, strh, strf), "vide" LIST(strl, strh, strf), "auds" LIST(strl, strh, strf), "txts" LIST(strl, strh, strf), movi LIST, and idx1

Arrangement in order of front view screen, rearview screen, audio recording, and subtitle function "Auds" LIST is omittable (in an environment in which the audio recording function is set to "off")

2-2. Header-file field value characteristic (applied to detailed correspondence probability determination: the number of corresponding items/the number of compared items=probability of correspondence)

Structure attribute values of an avih region: MaxBytesPerSec=0, PaddingGranularity=0, Flags=272, and Reserved=0x64000000DA05 (or 0x64000000E703 or 0x64000000B50B unidentified)

Strh structure values of "vids" LIST: fccHandler=0x48323634 ("H264," applied to basic comparison), Scale=100, Quality=−1, and SampleSize=0

Strh structure values of "auds" LIST: fccHandler=1, Scale=1, Quality=−1, and SampleSize=1

Strh structure values of "txts" LIST: fccHandler=0, Scale=100, Rate=0, Quality=−1, and SampleSize=0

3. (Thinkware) iNavi CLAIR (pop)

3-1. Header file structural characteristic (applied to basic comparison)

Header LIST(hdrl, avih), "vide" LIST(strl, strh, strf), "auds" LIST(strl, strh, strf), "txts" LIST(strl, strh, strf), movi LIST, and idx1

Arrangement in order of front view screen, audio recording, and subtitle function "Auds" LIST is expected to be omittable in an environment in which the audio recording function is set to "off"

3-2. Header-file field value characteristic

Structure values of an avih field: MicroSecPerFrame=0, MaxBytesPerSec=0, Flags=272, SuggestedBufferSize=0, and Reserved=0x00

Strh structure values of "vids" LIST: fccHandler=0x41564331 ("AVC1," applied to basic comparison), Scale=1000, Quality=0, and SampleSize=0

Strh structure values of "auds" LIST: fccHandler=0, Scale=2, Quality=0, and SampleSize=2

Strh structure values of "txts" LIST: fccHandler=0x58424C42 ("XBLB," applied to basic comparison), Scale=1000, Quality=0, and SampleSize=0

4. (Thinkware) iNavi Black CLAIR: identical to CLAIR 5. (Thinkware) iNavi G100: rearview video is added to CLAIR 5-1. Header file structural characteristic (applied to basic comparison)

Header LIST(hdrl, avih), "vide" LIST(strl, strh, strf), "vide" LIST(strl, strh, strf), "auds" LIST(strl, strh, strf), "txts" LIST(strl, strh, strf), movi LIST, and idx1

Arrangement in order of front view screen, rearview screen, audio recording, and subtitle function "Auds" LIST is expected to be omittable in an environment in which the audio recording function is set to "off"

5-2. Header-file field value characteristic

Structure values of an avih field: MicroSecPerFrame=0, MaxBytesPerSec=0, Flags=272, SuggestedBufferSize=0, and Reserved=0x00

Strh structure values of "vids" LIST: fccHandler=0x41564331 ("AVC1," applied to basic comparison), Scale=1000, Quality=0, and SampleSize=0

Strh structure values of "auds" LIST: fccHandler=0, Scale=2, Quality=0, and SampleSize=2

Strh structure values of "txts" LIST: fccHandler=0x58424C42 ("XBLB," applied to basic comparison), Scale=1000, Quality=0, and SampleSize=0

6. (Thinkware) iNavi E100

6-1. Header file structural characteristic (applied to basic comparison)

Header LIST(hdrl, avih), "vide" LIST(strl, strh, strf), "auds" LIST(strl, strh, strf), "txts" LIST(strl, strh, strf), movi LIST, and idx1

Arrangement in order of front view screen, audio recording, and subtitle function "Auds" LIST is expected to be omittable in an environment in which the audio recording function is set to "off"

6-2. Header-file field value characteristic

Structure values of an avih field: MicroSecPerFrame=0, MaxBytesPerSec=0, Flags=272, SuggestedBufferSize=0, and Reserved=0x00

Strh structure values of "vids" LIST: fccHandler=0x4D5034561 ("MP4V," applied to basic comparison), Scale=1000, Quality=0, and SampleSize=0

Strh structure values of "auds" LIST: fccHandler=0, Scale=2, Quality=0, and SampleSize=2

Strh structure values of "txts" LIST: fccHandler=0x58424C42 ("XBLB," applied to basic comparison), Scale=1000, Quality=0, and SampleSize=0

7. (FineVu) CR-200HD 7-1. Header file structural characteristic (applied to basic comparison)

Header LIST(hdrl, avih), "vide" LIST(strl, strh, strf, JUNK), "auds" LIST(strl, strh, strf, JUNK), odml JUNK, "INFO" LIST(INAM, ISFT, JUNK), movi LIST, and idx1

Arrangement in order of front view screen, audio recording, and SW information

"Auds" LIST is expected to be omittable in an environment in which the audio recording function is set to "off"

7-2. Header-file field value characteristic

An strh structure value of "vids" LIST: fccHandler=0x48323634 ("H264")

An INAM string value="CR-200HD" (applied to basic comparison)

An ISFT string value=Lavf52.50.0 (applied to basic comparison)

8. (FineVu) CR-500HD 8-1. Header file structural characteristic (applied to basic comparison)

Header LIST(hdrl, avih), "vide" LIST(strl, strh, strf, JUNK), "auds" LIST(strl, strh, strf, JUNK), odml JUNK, "INFO" LIST(INAM, ICMT, ISFT), JUNK, movi LIST, and idx1

Arrangement in order of front view screen, audio recording, and SW information

"Auds" LIST is expected to be omittable in an environment in which the audio recording function is set to "off"

8-2. Header-file field value characteristic

An strh structure value of "vids" LIST: fccHandler=0x48323634 ("H264")

An INAM string value="CR-500HD" (applied to basic comparison)

An ICMT string value=1.00.015 (firmware version)

An ISFT string value=Lavf52.50.0 (applied to basic comparison)

9. (FineVu) FINEPRO 9-1. Header file structural characteristic (applied to basic comparison)

Header LIST(hdrl, avih), "vide" LIST(strl, strh, strf, JUNK), "auds" LIST(strl, strh, strf, JUNK), odml JUNK, "INFO" LIST(INAM, ICMT, ISFT), JUNK, movi LIST, and idx1

Arrangement in order of front view screen, audio recording, and SW information

"Auds" LIST is expected to be omittable in an environment in which the audio recording function is set to "off"

9-2. Header-file field value characteristic

An INAM string value="FINEPRO" (applied to basic comparison)

An ICMT string value=2.02.000

An ISFT string value=Lavf52.50.0

10. (Midong & Cinema) Urive shotgun 10-1. Header file structural characteristic

Header LIST(hdrl, avih), "vide" LIST(strl, strh, strf), "auds" LIST(strl, strh, strf), JUNK, movi LIST, and idx1

Whether JUNK is inserted even when "auds" LIST is omitted 10-2. Header-file field value characteristic JUNK values: 0x14 14 . . . 14 (repeated 24 times)

Structure values of an avih field: Flags=65552, SuggestedBufferSize=0, and Reserved=0x00

Strh structure values of "vids" LIST: fccHandler="H264" (applied to basic comparison), Scale=33333, SuggestedBufferSize=0, Quality=1, and SampleSize=0

11. (HYUNDAI MnSOFT) Softman r700

11-1. Header file structural characteristic (applied to basic comparison)

Header LIST(hdrl, avih), "vide" LIST(strl, strh, strf, JUNK), "auds" LIST(strl, strh, strf, JUNK), odml JUNK, "INFO" LIST(ISFT), JUNK, movi LIST, and idx1

"Auds" LIST is expected to be omittable in an environment in which the audio recording function is set to "off"

11-2. Header-file field value characteristic

An ISFT string value="PotEncoder" (applied to basic comparison)

Strh structure values of "vids" LIST: fccHandler="DIVX" (applied to basic comparison), Scale=1, Quality=1, and SampleSize=0

12. (DIONJAMES) Black Angel 2 Channel HD 12-1. Header file structural characteristic (applied to basic comparison)

Header LIST(hdrl, avih), "vide" LIST(strl, strh, strf, JUNK), "auds" LIST(strl, strh, strf, JUNK), odml JUNK, "INFO" LIST(ISFT), JUNK, movi LIST, and idx1

"Auds" LIST is expected to be omittable in an environment in which the audio recording function is set to "off"

12-2. Header-file field value characteristic

An ISFT string value=Lavf55.0.100 (applied to basic comparison)

Strh structure values of "vids" LIST: fccHandler="H264" (applied to basic comparison), Scale=1000, Quality=1, and SampleSize=0

Here, an INAM string value may denote the title of a file, and the ISFT string value may denote SW used.

Figure 8:
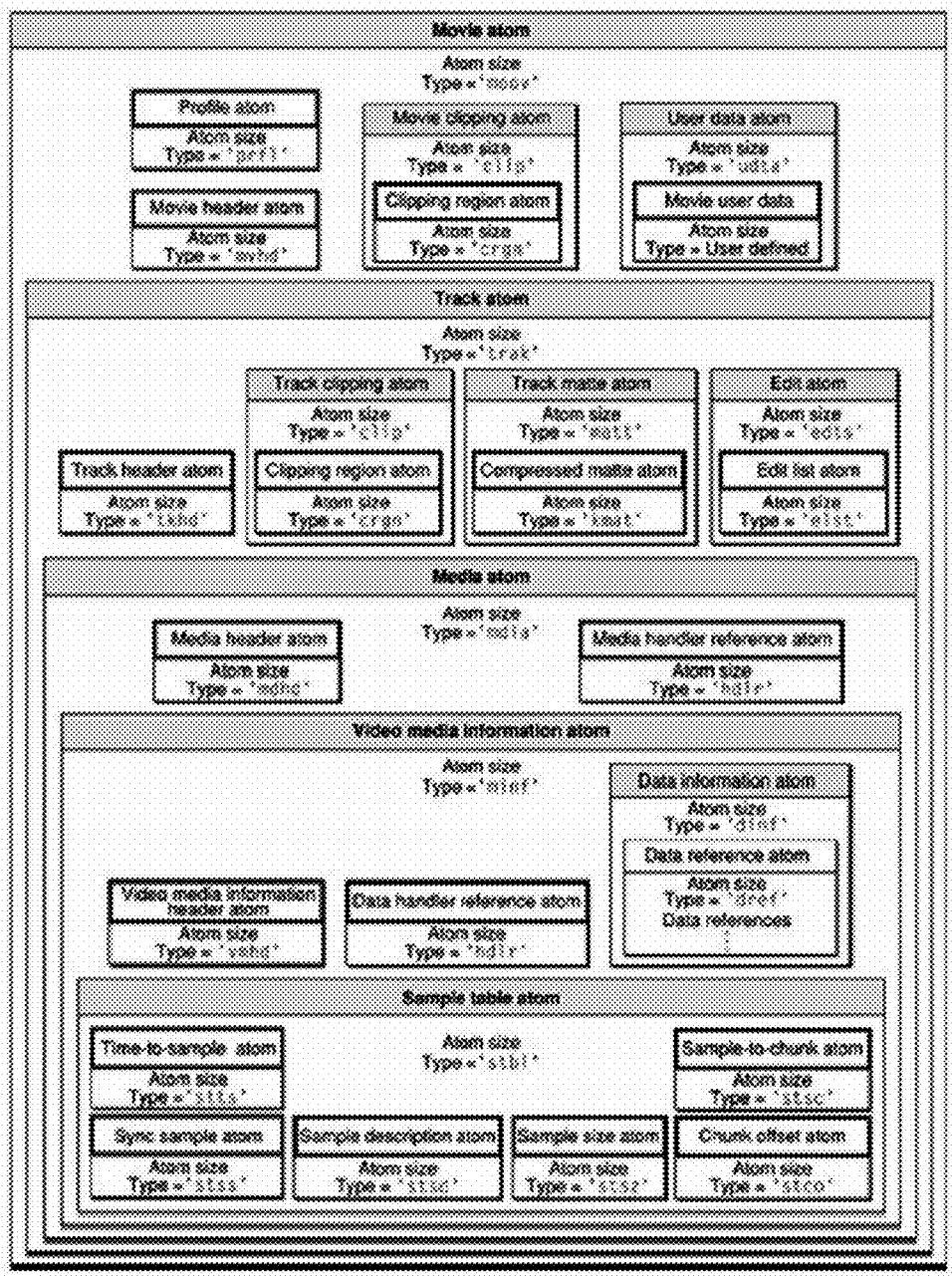
FIG. 8 shows a structure of the QuickTime file format (QTFF) which is referred to by a file structure in the motion picture experts group (MPEG)-4 part 14 (mp4) format.

FIG. 8 shows a structure of the QuickTime file format (QTFF) which is referred to by an mp4-format file structure.

Prior to describing an mp4-format file structure, the QTFF structure which is referred to by a file structure in the mp4 format will be described. A basic data unit in a QuickTime file is atom. Each atom includes a size field and a type field before other data. The size field represents the total number of bytes including bytes of the size and type fields in the atom, and the type field represents the type and the format of data stored in the atom. The size field and the type field may follow a version field and a flag field.

As shown in FIG. 8, a sample structure of a video having one track in the QTFF may include one movie atom. The movie atom may include a profile atom, a movie header atom, a movie clipping atom including a clipping region atom, a user data atom including movie user data, and a track atom. The track atom may include a track header atom, a track clipping atom including a clipping region atom, a track matte atom including a compressed matte atom, an edit atom including an edit list atom, and a media atom. The media atom may include a media header atom, a media handler reference atom, and a video media information atom, and the video media information atom may include a video media information header atom, a data handler reference atom, and a data information atom including a data reference atom, and a sample table atom. The sample table atom may include a time-to-sample atom, a sync sample atom, a sample description atom, a sample size atom, a sample-to-chunk atom, and a chunk offset atom.

Figure 7:
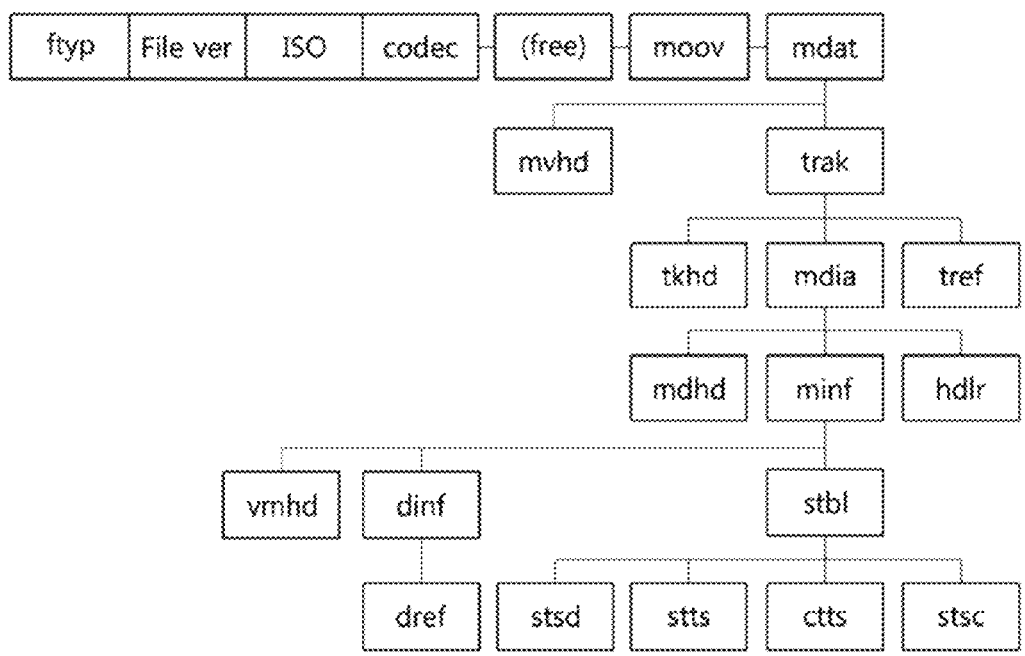
FIG. 7 is a diagram showing a header structure of an mp4-format video file.

FIG. 7 is a diagram showing a header structure of an mp4-format video file.

A method of verifying the integrity of a video file according to an example embodiment of the present invention when an input video file is in the mp4 format will be described below.

Mp4 is an abbreviation of MPEG-4 part 14 and is a media container format standard. In general, mp4 is a video file in which images compressed with the MPEG-4 AVC(H264) codec and audio compressed with the advanced audio coding (AAC) or mp3 codec are combined. However, other codecs are frequently used in practice, and thus an additional codec may be installed. Mp4 has an 8-byte basic structure of atoms including a 4-byte size and a 4-byte type. In FIG. 7, the sequence of moov and mdat may be changed. However, for ease of interpretation, it may be advantageous for moov to come before mdat.

A header structure of an mp4-format video file will be described below.

ftyp: a file type for representing compatibility of the file
mdat: media data for storing actual media
iods: object description information
moov: a box for storing all metadata of media
mvhd: movie header information
trak: a box for defining a single track in a movie
tkhd: track header information
mdia: a media type and sample data box
tref: track information which is referred to for track meta-processing
mdhd: general header information related to media
minf: a box for storing media information and information for obtaining sample data
hdlr: a handler media type
vmhd: media information header
dinf: a box for storing data information and information on the location of sample data
stbl: a sample table box
dref: file name and whether data is present in the file
stsd: information for sample decoding
stts: time information of a sample
ctts: composition location information
stsc: the number of samples in a chunk
stsz: a sample size in a chunk
stco: the location of a chunk
edts: a box for storing edit information
elst: a box for storing an edit list
Table 7 to Table 24 show detailed information about the header structure of an mp4-format video file. Table 7 shows detailed information about mvhd, Table 8 shows detailed information about iods, Table 9 shows detailed information about ObjectDescriptor of Table 8, Table 10 shows detailed information about tkhd, Table 11 shows detailed information about mdhd, and Table 12 shows detailed information about hdlr. Table 13 shows detailed information about vmhd, Table 14 shows detailed information about dinf, and Table 15 shows detailed information about dredf. Table 16 shows detailed information about stts, Table 17 shows detailed information about stsd as a sample description atom, and Table 18 shows detailed information about stsd as an H.264 sample description atom. Table 19 shows detailed information about esds, Table 20 shows detailed information about stsz, and Table 21 shows detailed information about stsc. Table 22 shows detailed information about stco, Table 23 shows detailed information about stss, and Table 24 shows detailed information about avcC.

TABLE 7

Movie Header Atom: mvhd

| | | |
|---|---|---|
| Size | 32 bits | The size of the movie header atom |
| Type | 32 bits | "mvhd" |
| Version | 8 bits | The version of the movie header atom (8 byte time is used in the case of 1, and 4 byte time is used in the case of 0) |
| Flags | 24 bits | 0 |
| Creation-time | 64 bits or 32 bits | The time when the file was created |
| Modification-time | 64 bits or 32 bits | The time when the file was modified |
| Timescale | 64 bits or 32 bits | The timescale of the file |
| Duration | 64 bits or 32 bits | The playing time of the file (based on timescale) |
| Reserved | 32 bits | 0x00010000 |
| Reserved | 16 bits | 0x0100 |
| Reserved | 16 bits | 0 |
| Reserved | 32 bits *2 | 0 |
| Reserved | 32 bits *9 | 0x00010000, 0, 0, 0, 0x00010000, 0, 0, 0, 0x40000000 |
| Reserved | 32 bits *6 | 0 |
| Next-track-ID | 32 bits | The ID number of a next available track |

TABLE 8

IOD Atom: iods

| | | |
|---|---|---|
| Size | 32 bits | The size of the IOD atom |
| Type | 32 bits | "iods" |
| Version | 8 bits | 0 |
| Flags | 24 bits | 0 |
| ObjectDescriptor | Variable | Initial Object Descriptor |

TABLE 9

ObjectDescriptor

| | | |
|---|---|---|
| Tag | 8 bits | 0x10 |
| Length | 32 bits | 0x80808019 |
| ObjectDescriptorID | 10 bits | 1 |
| URL_Flag | 1 bit | 0 |
| IncludedInlineProfileLevelFlag | 1 bit | 0 |
| Reserved | 4 bits | 0xF |
| ODProfileLevelIndication | 8 bits | 0xFF |
| SceneProfileLevelIndication | 8 bits | 0xFF |
| AudioProfileLevelIndication | 8 bits | 0x01 |
| VisualProfileLevelIndication | 8 bits | 0x03 |

TABLE 9-continued

ObjectDescriptor

| | | |
|---|---|---|
| GraphicsProfileLevelIndication | 8 bits | 0xFF |
| Tag | 8 bits | 0x0E |
| Length | 32 bits | 0x80808004 |
| ES_ID | 32 bits | 0D or the ID of a BIFS track |
| Tag | 8 bits | 0x0E |
| Length | 32 bits | 0x80808004 |
| ES_ID | 32 bits | 0D or the ID of a BIFS track |

TABLE 10

Track Header Atom: tkhd

| | | |
|---|---|---|
| Size | 32 bits | The size of the track header atom |
| Type | 32 bits | "tkhd" |
| Version | 8 bits | The version of the track header atom (8 byte time is used in the case of 1, and 4 byte time is used in the case of 0) |
| Flags | 24 bits | 0x000001 |
| Creation-time | 64 bits or 32 bits | The time when the track was created |
| Modification-time | 64 bits or 32 bits | The time when the track was modified |
| Track-ID | 32 bits | The ID value of the track |
| Reserved | 32 bits | 0 |
| Duration | 32 bits | The playing time of the track (based on movietimescale) |
| Reserved | 32 bits *3 | 0 |
| Reserved | 16 bits | 0 |
| Reserved | 16 bits | 0 |
| Reserved | 32 bits *9 | 0x00010000, 0, 0, 0, 0x00010000, 0, 0, 0, 0x4000000 |
| Reserved | 32 bits | 0x01400000 |
| Reserved | 32 bits | 0x00F00000 |

TABLE 11

Media Header Atom: mdhd

| | | |
|---|---|---|
| Size | 32 bits | The size of the media header atom |
| Type | 32 bits | "mdhd" |
| Version | 8 bits | The version of the media header atom (8 byte time is used in the case of 1, and 4 byte time is used in the case of 0) |
| Flags | 24 bits | 0 |
| Creation-time | 64 bits or 32 bits | The time when the media was created |
| Modification-time | 64 bits or 32 bits | The time when the media was modified |
| Timescale | 32 bits | The timescale of the media |
| Duration | 64 bits or 32 bits | The playing time of the file (based on the mediatimescale) |
| Pad | 1 bit | 0 |
| Language | 5 bits *3 | Packed ISO-639-2/T language code |
| Reserved | 16 bits | 0 |

TABLE 12

Handler Atom: hdlr

| | | |
|---|---|---|
| Size | 32 bits | The size of the handler atom |
| Type | 32 bits | "hdrl" |
| Version | 8 bits | 0 |
| Flags | 24 bits | 0 |
| Reserved | 32 bits | 0 |
| Handler-type | 32 bits | "vide" |
| Reserved | 8 bits* 12 | 0 |
| String | Variable | "vide" |

TABLE 13

Media Information Header Atom: vmhd

| | | |
|---|---|---|
| Size | 32 bits | The size of the media information header atom |
| Type | 32 bits | "vmhd" |
| Version | 8 bits | 0 |
| Flags | 24 bits | 1 |
| Reserved | 64 bits | 0 |

TABLE 14

Data Information Atom: dinf

| | | |
|---|---|---|
| Size | 32 bits | The size of the data information atom |
| Type | 32 bits | "dinf" |

TABLE 15

Data Reference Atom: dref

| | | |
|---|---|---|
| Size | 32 bits | The size of the data reference atom |
| Type | 32 bits | "dref" |
| Version | 8 bits | 0 |
| Flags | 24 bits | 0 |
| Entry-count | 32 bits | 1 |
| Size | 32 bits | The size of a data entry atom |
| Type | 32 bits | "url" |
| Version | 8 bits | 0 |
| Flags | 24 bits | 0x000001 |

TABLE 16

Time-To-Sample Atom: stts

| | | |
|---|---|---|
| Size | 32 bits | The size of the time-to-sample atom |
| Type | 32 bits | "stts" |
| Version | 8 bits | 0 |
| Flags | 24 bits | 0 |
| Entry-count | 32 bits | The total number of sample count and sample delta pairs |
| Sample-count | 32 bits | The number of consecutive samples having the same delta value |
| Sample-delta | 32 bits | Duration of samples (based on the mediatimescale) |
| <Continue> | | |
| Sample-count | 8 bits | The number of consecutive samples having the same delta value |
| Sample-delta | 24 bits | Duration of samples (based on the mediatimescale) |

TABLE 17

Sample Description Atom: stsd

| | | |
|---|---|---|
| Size | 32 bits | The size of the sample description atom |
| Type | 32 bits | "stsd" |
| Version | 8 bits | 0 |
| Flags | 24 bits | 0 |
| Entry-count | 32 bits | 1 |
| Size | 32 bits | The size of a sample entry atom |
| Type | 32 bits | "mp4v" |
| Reserved | 8 bits *6 | 0 |
| Data-reference-index | 16 bits | 1 |
| Reserved | 32 bits *4 | 0 |
| Reserved | 32 bits | 0x01400F0 |
| Reserved | 32 bits | 0x00480000 |

TABLE 17-continued

| Sample Description Atom: stsd | | |
|---|---|---|
| Reserved | 32 bits | 0x00480000 |
| Reserved | 32 bits | 0 |
| Reserved | 16 bits | 1 |
| Reserved | 8 bits *32 | 0 |
| Reserved | 16 bits | 24 |
| Reserved | 16 bits | −1 |
| ESDAtom | Variable | ES Descriptor |

TABLE 18

| H.264 Sample description: stsd | | |
|---|---|---|
| Size | 32 bits | The size of the sample description box |
| Type | 32 bits | "stsd" |
| Version | 8 bits | 0 |
| Flags | 24 bits | 0 |
| Entry-count | 32 bits | The number of 1s (subordinate regions are repeated as many times as the number) |
| Size | 32 bits | The size of the sample entry box |
| Type | 32 bits | "avc1" |
| Reserved | 8 bits *6 | 0 |
| Data-reference-index | 16 bits | 1 |
| Pre-defined | 16 bits | 0 |
| Reserved | 16 bits | 0 |
| Pre-defined | 32 bits *3 | 0 |
| Width | 16 bits | A maximum width per pixel of a stream |
| Height | 16 bits | A maximum height per pixel of a stream |
| Horizresolution | 32 bits | 0x00480000 //72 dpi |
| Vertiresolution | 32 bits | 0x00480000 //72 dpi |
| Reserved | 32 bits | 0 |
| Frame_count | 16 bits | 1 |
| Compressorname | 8 bits *32 | 0 |
| Depth | 16 bits | 0x0018 |
| Pre-defined | 16 bits | −1 |
| AVCConfigurationBox | Variable | AVCVideoConfigurationRecord |
| MPEG4ExtensionDescriptorsBox | Variable | Descriptor //Option |

TABLE 19

| ES description Atom: esds | | |
|---|---|---|
| Size | 32 bits | The size of the ESD atom |
| Type | 32 bits | "esds" |
| Version | 8 bits | 0 |
| Flags | 24 bits | 0 |
| Tag | 8 bits | 0x03 |
| Length | 32 bits | The length of an ES descriptor |
| ES_ID | 16 bits | 0 |
| StreamDependenceFlag | 1 bit | 0 |
| URL_Flag | 1 bit | 0 |
| OCRstreamFlag | 1 bit | 0 |
| StreamPriority | 5 bits | 0 |
| Tag | 8 bits | 0x04 |
| Length | 16 bits | The length of DecoderConfigDescriptor |
| ObjectTypeIndication | 8 bits | 0x20 |
| StreamType | 6 bits | 0x04 |
| Upstream | 1 bit | 0 |
| Reserved | 1 bit | 1 |
| BufferSizeDB | 24 bits | The size of DecodingBuffer |
| MaxBitrate | 32 bits | A maximum bitrate |
| AvgBitrate | 32 bits | An average bitrate |
| Tag | 8 bits | 0x05 |
| Length | 8/16/24/32 bits (Variable) | The length of DecoderSpecificInfo |
| Infodata | Variable | Includes all of VisualObjectSequence and VisualObject and VideoObjectLayer excluding Group_of_VideoObjectPlane and VideoObjectPlane |

TABLE 19-continued

| ES description Atom: esds | | |
|---|---|---|
| Tag | 8 bits | 0x06 |
| Length | 8/16/24/32 bits (Variable) | The length of SLConfigDescriptor |
| Predefined | 8 bits | 2 |

TABLE 20

| Sample Size Atom: stsz | | |
|---|---|---|
| Size | 32 bits | The size of the sample size atom |
| Type | 32 bits | "stsz" |
| Version | 8 bits | 0 |
| Flags | 24 bits | 0 |
| Sample-size | 32 bits | 0 |
| Sample-count | 32 bits | The total number of samples |
| Entry-size | 32 bits | The size of a first sample |
| | | <Continue> |
| Entry-size | 32 bits | The size of a last sample |

TABLE 21

| Sample To Chunk Atom: stsc | | |
|---|---|---|
| Size | 32 bits | The size of the sample-to-chunk atom |
| Type | 32 bits | "stsc" |
| Version | 8 bits | 0 |
| Flags | 24 bits | 0 |
| Entry-count | 32 bits | A first chunk, samples per chunk, and the total number of sample description indices |
| First-chunk | 32 bits | The index of the first of consecutive chunks having the same number of samples per chunk and the same sample description index |
| Sample-per-chunk | 32 bits | The number of samples per chunk |

TABLE 21-continued

Sample To Chunk Atom: stsc

| | | |
|---|---|---|
| Sample-description-index | 32 bits | 1 |
| <Continue> | | |
| First-chunk | 32 bits | The index of the first of consecutive chunks having the same number of samples per chunk and the same sample description index |
| Sample-per-chunk | 32 bits | The number of samples per chunk |
| Sample-description-index | 32 bits | 1 |

TABLE 22

Chunk Offset Atom: stco

| | | |
|---|---|---|
| Size | 32 bits | The size of the chunk offset atom |
| Type | 32 bits | "stco" |
| Version | 8 bits | 0 |
| Flags | 24 bits | 0 |
| Entry-count | 32 bits | The total number of chunks |
| Chunk-offset | 32 bits | The offset from the beginning of the file to the first chunk |
| <Continue> | | |
| Chunk-offset | 32 bits | The offset from the beginning of the file to a last chunk |

TABLE 23

Sync Sample Atom: stss

| | | |
|---|---|---|
| Size | 32 bits | The size of the sync sample atom |
| Type | 32 bits | "stss" |
| Version | 8 bits | 0 |
| Flags | 24 bits | 0 |
| Entry-count | 32 bits | The total number of SyncSamples |
| SampleNumber | 32 bits | SyncSampleNumber |
| <Continue> | | |
| SampleNumber | 32 bits | SyncSampleNumber |

TABLE 24

H.264 AVC Configuration Box: avcC

| | | |
|---|---|---|
| Size | 32 bits | The size of the AVC configuration box |
| Type | 32 bits | "avcC" |
| ConfigurationVersion | 8 bits | 1 |
| AVCProfileIndication | 8 bits | Profile code |
| Profilecompatibility | 8 bits | Indicates a compatible profile |
| AVCLevelIndication | 8 bits | Level code |
| Reserved | 6 bits | 0b111111 |
| LengthSizeMinusOne | 2 bits | The number of bytes of a network abstraction layer unit (NALU) length field − 1 |
| Reserved | 3 bits | 0b111 |
| NumofSequenceParameterSets | 5 bits | The number of sequence parameter sets (SPSs) |
| SequenceParameterSetLength | 16 bits | The length of a parameter set NALU |
| SequenceParameterSetNALUnit | Variable | An SPS NALU |
| <Continue> | | |
| SequenceParameterSetLength | 16 bits | The length of a parameter set NALU |
| SequenceParameterSetNALUnit | Variable | An SPS NALU |

TABLE 24-continued

H.264 AVC Configuration Box: avcC

| | | |
|---|---|---|
| NumofPictureParameterSets | 8 bits | The number of picture parameter sets (PPSs) |
| PictureParameterSetLength | 16 bits | The length of a parameter set NALU |
| PictureParameterSetNALUnit | Variable | A PPS NALU |
| <Continue> | | |
| PictureParameterSetLength | 16 bits | The length of a parameter set NALU |
| PictureParameterSetNALUnit | Variable | A PPS NALU |

In the atom structure of an mp4-format video file, "vide" track and "soun" track may have different values, and an stsd atom may be interpreted in different ways depending on a codec type.

The atom structure of an mp4-format video file may include a free, universally unique identifier (uuid), udta, and composition time to sample box (ctts). Free may denote an unused space, and uuid, udta, and ctts will be described with reference to FIGS. 9 to 12.

FIG. 9 is a table showing a list of uuids in an mp4-format file structure.

The structure of an mp4-format video file may support private extensions by using a uuid-type box. In the uuid-type box, the first 16 bytes which become payload data normally may be an arbitrary 16-byte ID uuid, but actual payload data may begin immediately after the uuid. Here, the payload data may denote 184-byte data containing the actual content of a 188-byte MPEG transport stream (TS) packet excluding 4-byte header information containing identification information of the packet. The uuid list of FIG. 9 may not necessarily be formal, and may not be assumed to be meaningful in all formats.

Figure 10:
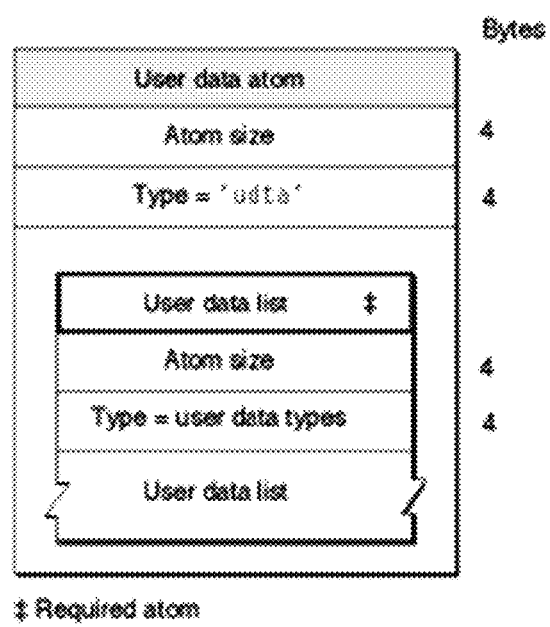
FIG. 10 is a diagram showing an arrangement of a user data atom (udta) in an mp4-format file structure.

FIG. 10 is a diagram showing an arrangement of a udta in an mp4-format file structure.

In the structure of an mp4-format video file, a udta may be equivalent to movie user data which is used in the QTFF file structure. A user data atom may permit defining and storing data related to QuickTime objects, such as moov, trak, and mdia. Also, a user data atom may include information that QuickTime searches for, such as copyright information that is simply ignored by QuickTime, whether a movie should be repeated, and arbitrary information that is simply ignored by QuickTime and received by or provided to an application.

A user data atom whose parent atom is a movie atom may include data related to a whole movie. A user data atom whose parent atom is a track atom may include information related to a specific track. Although a QuickTime movie file may include many user data atoms, only one user data atom may be permitted to be a child atom of a given movie or track atom.

A user data atom may have one udta-type atom. The inside of a user data atom may be represented as a list of atoms that describe respective parts of user data. User data may provide a simple method of extending information stored in a QuickTime movie. For example, a user data atom may store a window position, a playing characteristic, and generation information of a movie. A developer may generate a new data atom type which is recognized by an application, but the application may ignore a data atom type which is not recognized.

As shown in FIG. 10, a user data atom may include a size, a type, and a user data list. The size may be a 32-bit integer for specifying the number of bytes in the user data atom. The type may be a 32-bit integer for identifying the atom type and may be set to udta. The user data list will be described with reference to FIG. 11.

FIG. 11 is a table showing item types of a user data list in an mp4-format file structure.

A user data list may be composed as a series of atoms. Respective data elements of a user data list may include payload data, size information, and type information. A data list may be selectively ended by a 32-bit integer which is set to 0. When a program for reading a user data atom is written, it may be necessary to allow a terminating 0. On the other hand, when a program for generating a user data atom is written, it is possible to safely remove a terminating 0.

Referring to FIG. 11, a user data item which is mentioned as a keyword and user data items whose alignment is marked may be intended to be used when there is no predetermined alignment order in display text, for example, like in oriental languages in which keywords are classified depending on contextual meanings. Here, keywords may be algorithmically aligned such that the corresponding items may be arranged in correct order.

Outputs of atoms for window position, looping, playing a selected region, and playing the whole video, and a video atom may control the way in which QuickTime shows a movie. Such atoms may be interpreted when a parent atom of a user data atom is moov, but may be ignored when a track atom includes a part of user data.

All types of all user data list entries beginning with ASCII 169 may be defined to be international text. Such list entries may include a list of strings having related language code. When various versions of the same text are stored, one user data text item may include translations in other languages. A language code value smaller than 0x400 may be Mac language code, and a language code value equal to or larger than 0x400 may be international standardization organization (ISO) language code. Other 0x7FFF language code may represent an unspecified Mac language.

Figures 12, 13:
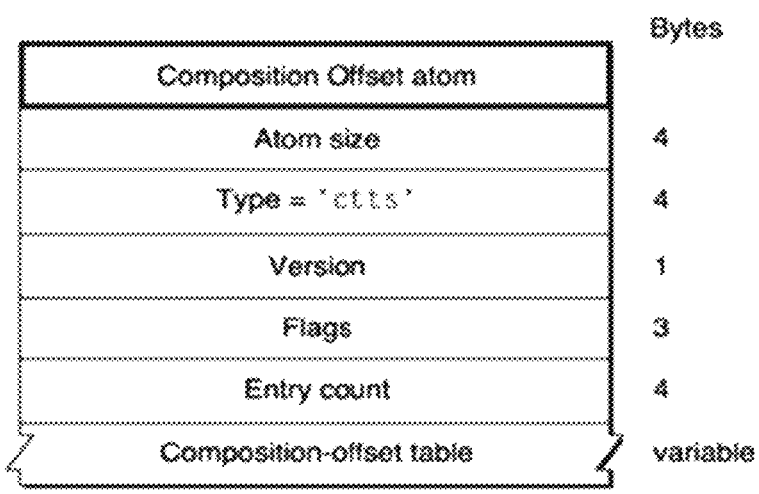
FIG. 12 is a diagram showing an arrangement of a composition time to sample box (ctts) in an mp4-format file structure.
FIG. 13 is a diagram showing an arrangement of ctts table items in an mp4-format file structure.

FIG. 12 is a diagram showing an arrangement of a ctts in an mp4-format file structure.

In an mp4-format file structure, ctts denotes a composition offset atom. In general, stts is used, but ctts may be included when samples are not in chronological order.

Referring to FIG. 12, a composition offset atom may include a size, a type, a version, flags, and an entry count. The size may be a 32-bit integer for specifying the number of bytes of the composition offset atom, and the type may be a 32-bit integer for identifying an atom type and may be set to ctts. The version may be 1 byte for specifying the version of the atom, and the flags may be a 3-byte space reserved for an offset flag. The flags may be set to 0. The entry count will be described with reference to FIG. 13.

FIG. 13 is a diagram showing an arrangement of ctts table items in an mp4-format file structure.

In the arrangement of FIG. 13, an entry count of a composition offset atom may be 32 bits for specifying the number of sample numbers without any sign. Referring to FIG. 13, the table entry arrangement of the composition offset atom may include SampleCount and compositionOffset. SampleCount is a composition offset calculated in the field and may be a 32-bit integer for providing the number of consecutive samples without any sign, and compositionOffset may be a 32-bit integer for indicating a calculated value of compositionOffset with a sign.

An apparatus for verifying the integrity of a video file according to an example embodiment of the present invention may include whether there is basic configuration information including a file header structure, ftyp, mvhd, tkhd, hdlr, and stsd as regions that are determined to be edited or not, a free atom for storing developer information without restraint, a user data atom for storing developer information according to a format, an edts atom for storing edit information, an elst atom for storing an edit list, and a ccts atom for storing a composition offset which is included when samples are not in chronological order.

In a method of verifying the integrity of a video file according to an example embodiment of the present invention, video recording devices may have different operation characteristics. Therefore, operation characteristics of some video recording devices which record mp4-format videos will be listed below by way of example. However, video recording devices of the present invention are not limited to those listed below.

1. (DABONDA) HDA-100V 1-1. Header file structural characteristic (applied to basic comparison)

Ftyp, free, free, free, free, mdat, moov, mvhd, iods, soun trak(tkhd, mdia, mdhd, hdlr, minf, smhd, dinf, dref, stbl, stsd, stsz, stts, stsc, stco), vide trak(tkhd, mdia, mdhd, hdlr, minf, vmhd, dinf, dref, stbl, stsd, stsz, stts, stsc, stco, stss), and sdsm trak(tkhd, mdia, mdhd, hdlr, minf)

A structure of audio, video, and subtitle tracks 1-2. Header-file field value characteristic Attribute values of an ftyp structure: Major Brand=mp42, Minor Version=00 00 00 01, Compatible Brands=isom, Compatible Brands 0=3gp4, and Compatible Brands 1=3gp5

Free region values: 1st free="HRA2," 2nd free="HRA2V4PM," 3rd free="HRA2XBLB," and 4th free="Feb. 18, 2011"

An hdrl structure attribute value of sdsm trak: "XBLB"

An stsd structure attribute value of soun trak includes "mp4a," and an stsd structure attribute value of vide trak includes "mp4v"

A reserved region value of an mvhd structure, a reserved region value of a tkhd structure, and a reserved region value of an stsd structure 2. (DABONDA) Gallery DBR-200H 2-1. Header file structural characteristic (applied to basic comparison)

Ftyp, free, free, free, free, free, mdat, moov, mvhd, iods, soun trak(tkhd, mdia, mdhd, hdlr, minf, smhd, dinf, dref, stbl, stsd, stsz, stts, stsc, stco), vide trak(tkhd, mdia, mdhd, hdlr, minf, vmhd, dinf, dref, stbl, stsd, stsz, stts, stsc, stco, stss), vide trak( ), and sdsm trak(tkhd, mdia, mdhd, hdlr, minf)

A structure of audio, video, video, and subtitle tracks 2-2. Header-file field value characteristic Attribute values of an ftyp structure: Major Brand=mp42, Minor Version=00 00 00 01, Compatible Brands=isom, Compatible Brands 0=3gp4, and Compatible Brands 1=3gp5

Free region values: 1st free="HRA2," 2nd free="HRA21CVA," 3rd free="HRA21CVA," 4th free="HRA2XBLB," and 5th free="Sep. 5, 2012"

An hdrl structure attribute value of sdsm trak: "XBLB"

An stsd structure attribute value of soun trak includes "mp4a," and an stsd structure attribute value of vide trak includes "avcC"

A reserved region value of an mvhd structure, a reserved region value of a tkhd structure, and a reserved region value of an stsd structure 3. (DABONDA) New Gallery DBR-200HN: identical to DBR-200H 3-1. Header file structural characteristic (applied to basic comparison)
  Ftyp, free, free, free, free, free, mdat, moov, mvhd, iods, soun trak(tkhd, mdia, mdhd, hdlr, minf, smhd, dinf, dref, stbl, stsd, stsz, stts, stsc, stco), vide trak(tkhd, mdia, mdhd, hdlr, minf, vmhd, dinf, dref, stbl, stsd, stsz, stts, stsc, stco, stss), vide trak( ), and sdsm trak(tkhd, mdia, mdhd, hdlr, minf)
  A structure of audio, video, video, and subtitle tracks
3-2. Header-file field value characteristic
  Attribute values of an ftyp structure: Major Brand=mp42, Minor Version=00 00 00 01, Compatible Brands=isom, Compatible Brands 0=3gp4, and Compatible Brands 1=3gp5
  Free region values: 1st free="HRA2," 2nd free="HRA21CVA," 3rd free="HRA21CVA," 4th free="HRA2XBLB," and 5th free="Jun. 10 2013"
  An hdrl structure attribute value of sdsm trak: "XBLB"
  An stsd structure attribute value of soun trak includes "mp4a," and an stsd structure attribute value of vide trak includes "avcC"
  A reserved region value of an mvhd structure, a reserved region value of a tkhd structure, and a reserved region value of an stsd structure
4. (PITTASOFT) BlackVue DR350
4-1. Header file structural characteristic (applied to basic comparison)
  Ftyp, free, mdat, moov, mvhd, vide trak(tkhd, mdia, mdhd, hdlr, minf, vmhd, dinf, dref, stbl, stsd, stts, stsz, stco, stsc, stss), and soun trak(tkhd, mdia, mdhd, hdlr, minf, smhd, dinf, dref, stbl, stsd, stts, stsz, stco, stsc)
  A structure of video and audio tracks
4-2. Header-file field value characteristic
  Attribute values of an ftyp structure: Major Brand=isom, Minor Version=00 00 02 00, Compatible Brands=isom, Compatible Brands 0=iso2, and Compatible Brands 1=Compatible Brands 2=mp41
  The attribute size of a free region is very large (399,498 bytes), "cprt Pittasoft Co., Ltd. 54210006F"
  There are values of the creation time and modification time of mvhd. Next-track-ID=3
  An hdlr structure of vide trak includes "PittaSoft Video Media Handler," and an stsd structure includes "vavc1"
  An hdlr structure of soun trak includes "PittaSoft Sound Media Handler," and an stsd structure includes "Kmp4a"
5. (PITTASOFT) BlackVue DR400
5-1. Header file structural characteristic (applied to basic comparison)
  Ftyp, free, mdat, moov, mvhd, vide trak(tkhd, mdia, mdhd, hdlr, minf, vmhd, dinf, dref, stbl, stsd, stts, stss, stsc, stsz, stco), soun trak(tkhd, mdia, mdhd, hdlr, minf, smhd, dinf, dref, stbl, stts, stsc, stsz, stco), udta, and meta
  A structure of video, audio, udta tracks
5-2. Header-file field value characteristic
  Attribute values of an ftyp structure: Major Brand=isom, Minor Version=00 00 02 00, Compatible Brands=isom, Compatible Brands 0=iso2, and Compatible Brands 1=avc1, Compatible Brands 2=mp41
  There is no attribute value of a free region
  There are values of the creation time and modification time of mvhd. Next-track-ID=3
  An hdlr structure of vide trak includes "VideoHandler," and an stsd structure includes "avcC"
  An hdlr structure of soun trak includes "SoundHandler," and an stsd structure includes "Wmp4a"
  Attribute values of a meta region include "Lavf53,5.0" and "mdirapp1"

Figure 14:
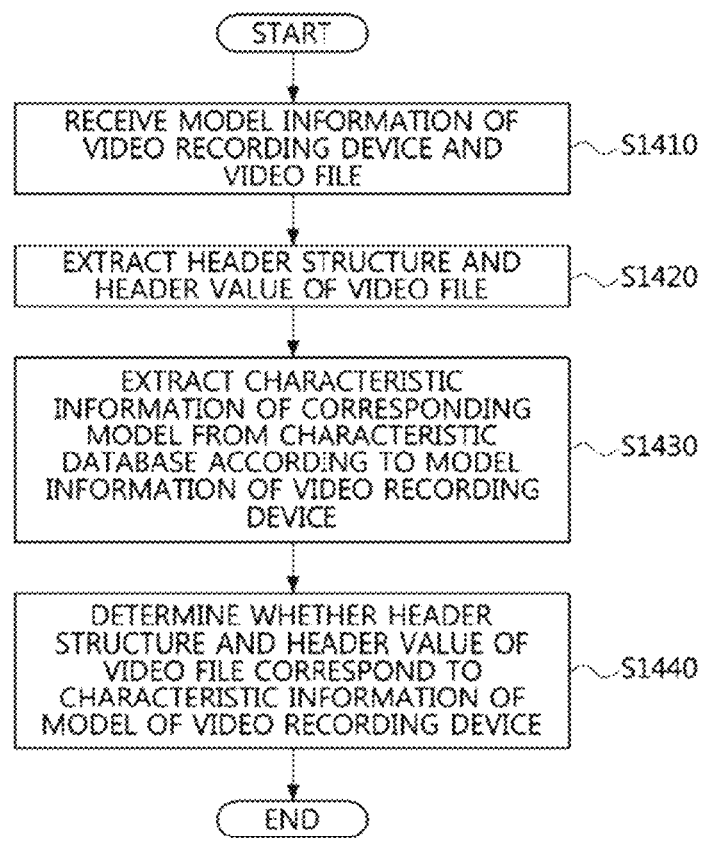
FIG. 14 is a flowchart illustrating a method of verifying the integrity of a video file according to an example embodiment of the present invention when model information of a video recording device which has recorded a video is acquired.

FIG. 14 is a flowchart illustrating a method of verifying the integrity of a video file according to an example embodiment of the present invention when model information of a video recording device which has recorded a video is acquired.

The apparatus 100 for verifying the integrity of a video file according to an example embodiment of the present invention may receive model information of a video recording device and a video file (S1410). The apparatus 100 may extract a header structure and a header value of the received video file (S1420), and may extract characteristic information of the corresponding model from the characteristic database 140 based on the received model information of the video recording device (S1430). Also, the apparatus 100 may compare the extracted header structure and header value of the video file with the characteristic information of the model and determine whether the extracted header structure and header value correspond to the characteristic information (S1440).

FIG. 15 is a flowchart illustrating a method of verifying the integrity of a video file according to another example embodiment of the present invention when model information of a video recording device which has recorded a video is not acquired.

The apparatus 100 for verifying the integrity of a video file according to an example embodiment of the present invention may receive only a video file (S1510). The apparatus 100 may extract a header structure and a header value of the received video file (S1520), and may compare the extracted header structure and header value with model-specific characteristic information of video recording devices stored in the characteristic database 140 (S1530). Also, the apparatus 100 may determine, according to the comparison results which are correspondence rates, the video recording device model which has recorded the video file (S1540).

In a method of verifying the integrity of a video file according to an example embodiment of the present invention, when an editing program is used, a header structure and a header value may vary according to the editing program. Therefore, when operation characteristics of editing programs may be previously stored in a characteristic database, it is possible to determine whether a video file has been modified by comparing a header structure and a header value of the video file with the operation characteristics of the editing programs, and also to extract an editing program.

It is possible to determine whether a video file has been modified. Operation characteristics of video editing programs for editing videos will be listed below by way of example. However, video editing programs of the present invention are not limited to those listed below.

1. Daum PotEncoder: v2.1.4.62
1-1. Avi file format characteristic
  A file header structure: header LIST(hdrl, avih), "vide" LIST(strl, strh, strf, JUNK), "auds" LIST(strl, strh, strf, JUNK), odml JUNK, "INFO" LIST(ISFT), JUNK, movi LIST, and idx1
  An ISFT string value="PotEncoder"
2. GOM Mix: v1.0.1.8
2-1. Avi file format characteristic
  A file header structure: header LIST(hdrl, avih), "vide" LIST(strl, strh, strf), "auds" LIST(strl, strh, strf), "INFO" LIST(ISFT), JUNK, movi LIST, and idx1
  An ISFT string value="GOM ENCODER (GAviWriter 1.0)"

A JUNK value=[gom junk]

2-2. Mp4 file format characteristic: avi→mp4, mp4→mp4

A file header structure: ftyp, free, mdata, moov, mvhd, trak, tkhd

There is no free region value mvhd structure values: there are creation-time and modification-time values tkhd structure values: the same creation-time and modification-time values There is a reserved region value 3. Gilisoft Video Editor: v7.0.2

3-1. Avi file format characteristic

A file header structure: header LIST(hdrl, avih), "auds" LIST(strl, strh, strf, JUNK), "vids" LIST(strl, strh, strf, JUNK), vprp, odml JUNK, INFOISFT JUNK, JUNK, movi LIST, and idx1

An INFOISFT string value="Lavf53,24.2" (an encoder library used by FFmpeg)

vprp: Opendml extension additionally uses a video properties header (vprp)

According to the inventive apparatus for verifying the integrity of a video file, it is possible to verify integrity based on a header structure and a header value and provide information about whether a video file, which is the target of verification, has been altered with another video file generated by a video recording device other than the video recording device which has generated the video file because a header structure and a header value vary according to software installed in a video recording device.

Also, according to the inventive apparatus for verifying the integrity of a video file, it is possible to provide information about whether a video file has been modified because a header structure and a header value are changed when the video is modified through an editing program.

Operation of a method of verifying the integrity of a video file according to an example embodiment of the present invention may be implemented using a computer-readable program or code in a computer-readable recording medium. The computer-readable recording medium includes all types of recording devices in which data that may be read by a computer system is stored. Also, the computer-readable recording medium may be distributed among computer systems connected via a network such that the computer-readable recording program or code may be stored and executed in a decentralized manner.

The computer-readable recording medium may include a hardware device specially configured to store and perform program instructions, such as a read-only memory (ROM), a random access memory (RAM), a flash memory, and the like. The program instructions may include not only a machine language code generated by a compiler but also a high level language code that may be executed by a computer using an interpreter, and the like.

Some aspects of the present invention have been described in the context of an apparatus, but may also represent the corresponding method. Here, a block or the apparatus corresponds to a step of the method or a characteristic of a step of the method. Likewise, aspects which have been described in the context of the method may be indicated by the corresponding blocks or items or characteristics of the corresponding apparatus. Some or all of steps of the method may be performed by (or using) a hardware device, such as a microprocessor, a programmable computer, or an electronic circuit. In some embodiments, one or more of important steps of the method may be performed by such a device.

In example embodiments, a programmable logic device (e.g., a field-programmable gate array (FPGA)) may be used to perform some or all of functions of the above-described methods. In example embodiments, the FPGA may operate in combination with a microprocessor for performing one of the above-described methods. In general, the methods may be performed by any hardware device.

While the example embodiments of the present invention and their advantages have been described in detail, it should be understood that various changes, substitutions and alterations may be made herein without departing from the scope of the invention.

What is claimed is:

1. An apparatus for verifying integrity of a video file, the apparatus comprising:
an extractor configured to extract a header structure and a header value of a verification-target video file;
a characteristic database configured to store model-specific characteristic information of one or more video recording devices; and
an analyzer configured to verify integrity of the verification-target video file by using the extracted header structure and header value and the model-specific characteristic information of the one or more video recording devices stored in the characteristic database,
wherein the model-specific characteristic information includes header structures and header values which are differently set in video foes according to models of the one or more video recording devices.

2. The apparatus of claim 1, further comprising an updater configured to update the model-specific characteristic information stored in the characteristic database.

3. The apparatus of claim 1, further comprising an input unit to which at least one piece of verification-target information is input.

4. The apparatus of claim 3, wherein when only the video file is input to the input unit, the analyzer determines, in the characteristic database, a video recording device model corresponding to the header structure and the header value of the video file.

5. The apparatus of claim 3, wherein when the video file and model information of a video recording device which is claimed to have recorded a video are input to the input unit, the analyzer extracts characteristic information according to the model of the claimed video recording device from the characteristic database and determines whether the extracted characteristic information according to the model of the video recording device corresponds to the header structure and the header value of the video file.

6. The apparatus of claim 5, wherein whether the extracted characteristic information corresponds to the header structure and the header value of the video file is represented as a probability from a number of corresponding items among a number of compared items.

7. The apparatus of claim 6, wherein when the video file is in an audio video interleaved (avi) format, a header value corresponding to the compared items includes at least one of an INAM string value representing a title of the video file, an ISFT string value representing software (SW) used for the video file, and an fccHandler value among stream header (strh) structure values of a video list (vide LIST).

8. The apparatus of claim 6, wherein when the video file is in a motion picture experts group (MPEG)-4 part 14 (mp4) format, a header value corresponding to the compared items includes at least one of an attribute value of a free region and an attribute value of a meta region.

9. A method of verifying integrity of a video file, the method comprising:
- extracting a header structure and a header value of a verification-target video file; and
- verifying integrity of the verification-target video file by using the extracted header structure and header value and model-specific characteristic information of video recording devices stored in a characteristic database,
- wherein the model-specific characteristic information includes header structures and header values which are differently set in video files according to models of the video recording devices.

10. The method of claim 9, further comprising updating the model-specific characteristic information stored in the characteristic database.

11. The method of claim 9, further comprising:
- receiving the video file; and
- determining, in the characteristic database, a video recording device model corresponding to the header structure and the header value of the video file.

12. The method of claim 9, further comprising:
- receiving the video file and model information of a video recording device which is claimed to have recorded a video;
- extracting characteristic information according to the received model information of the video recording device from the characteristic database; and
- determining whether the extracted characteristic information according to the model information of the video recording device corresponds to the header structure and the header value of the video file.

13. The method of claim 12, wherein whether the extracted characteristic information corresponds to the header structure and the header value of the video file is represented as a probability from a number of corresponding items among a number of compared items.

14. The method of claim 13, wherein when the video file is in an audio video interleaved (avi) format, a header value corresponding to the compared items includes at least one of an INAM string value representing a title of the video file, an ISFT string value representing software (SW) used for the video file, and an fccHandler value among stream header (strh) structure values of a video list (vide LIST).

15. The method of claim 13, wherein when the video file is in a motion picture experts group (MPEG)-4 part 14 (mp4) format, a header value corresponding to the compared items includes at least one of an attribute value of a free region and an attribute value of a meta region.

* * * * *